(12) United States Patent
Nakayama et al.

(10) Patent No.: US 9,229,244 B2
(45) Date of Patent: Jan. 5, 2016

(54) IMAGE-BLUR CORRECTION DEVICE, IMAGE-BLUR CORRECTION METHOD, AND IMAGE CAPTURE APPARATUS

(71) Applicant: Sony Corporation, Tokyo (JP)

(72) Inventors: Tatsuyuki Nakayama, Kanagawa (JP); Kousuke Tsuchihashi, Kanagawa (JP); Masahide Yamasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 34 days.

(21) Appl. No.: 14/132,555

(22) Filed: Dec. 18, 2013

(65) Prior Publication Data

US 2014/0176742 A1 Jun. 26, 2014

(30) Foreign Application Priority Data

Dec. 26, 2012 (JP) ................................ 2012-282503

(51) Int. Cl.
*H04N 5/232* (2006.01)
*H04N 5/77* (2006.01)
*H04N 9/804* (2006.01)
*G02B 27/64* (2006.01)

(52) U.S. Cl.
CPC .......... *G02B 27/646* (2013.01); *H04N 5/23241* (2013.01); *H04N 5/23258* (2013.01); *H04N 5/23287* (2013.01); *H04N 5/772* (2013.01); *H04N 9/8042* (2013.01)

(58) Field of Classification Search
CPC .......... H04N 5/23248; H04N 5/23264; H04N 5/23287; H04N 5/23241; H04N 5/23258
See application file for complete search history.

(56) References Cited

U.S. PATENT DOCUMENTS

| 5,978,600 A | * | 11/1999 | Takeuchi et al. ................. 396/53 |
| 6,944,397 B2 | * | 9/2005 | Miwa ............................. 396/106 |
| 7,592,759 B2 | * | 9/2009 | Shibatani ...................... 318/119 |
| 2006/0108964 A1 | * | 5/2006 | Shibatani ...................... 318/685 |

FOREIGN PATENT DOCUMENTS

JP 09-080541 3/1997

* cited by examiner

*Primary Examiner* — Ahmed A Berhan
(74) *Attorney, Agent, or Firm* — Hazuki International, LLC

(57) ABSTRACT

An image-blur correction device includes a drive-current output unit that outputs a first drive current for driving a first correction mechanism for correcting image blur in a first direction orthogonal to an optical axis and a second drive current for driving a second correction mechanism for correcting image blur in a second direction orthogonal to the optical axis and the first direction; and a drive-current limiting unit that limits the first drive current to a first limit value, limits the second drive current to a second limit value, limits a total value of the first and second drive currents to a third limit value smaller than a total value of the first and second limit values, varies the first limit value by changing a power-supply time of the first drive current, and varies the second limit value by changing a power-supply time of the second drive current.

14 Claims, 15 Drawing Sheets

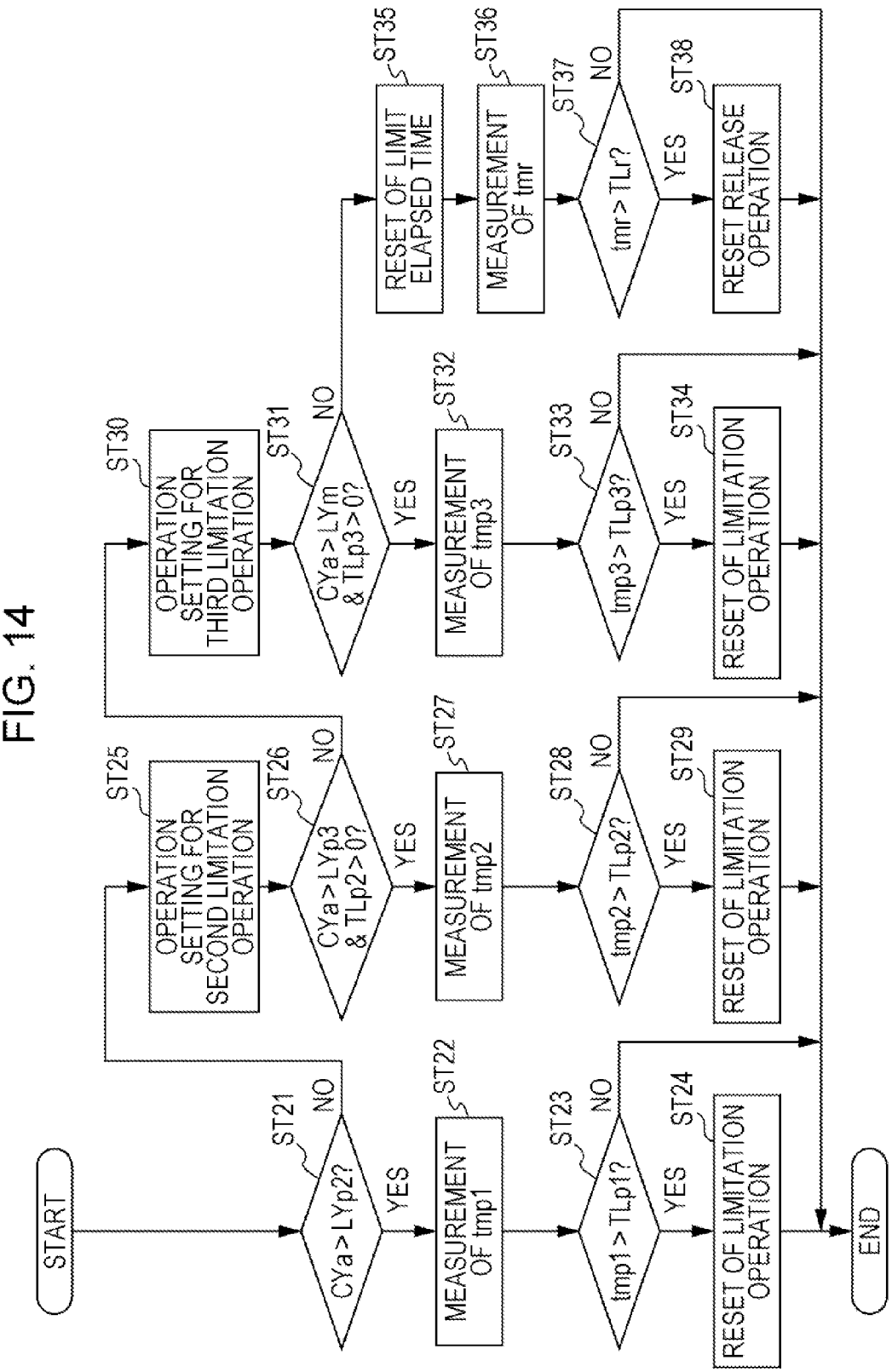

IMAGE-BLUR CORRECTION DEVICE, IMAGE-BLUR CORRECTION METHOD, AND IMAGE CAPTURE APPARATUS

CROSS REFERENCE TO RELATED APPLICATIONS

This application claims the benefit of Japanese Priority Patent Application JP 2012-282503 filed Dec. 26, 2012, the entire contents of which are incorporated herein by reference.

BACKGROUND

The present technology relates to an image-blur correction device, an image-blur correction method, and an image capture apparatus that allow image-blur correction to be performed in a favorable manner.

Some image capture apparatuses, such as video cameras and still cameras, are provided with an image-blur correction device for performing image-blur correction by moving a lens in a direction orthogonal to an optical-axis direction. In image capture apparatuses provided with such an image-blur correction device, a total value of powers supplied from two or more drive mechanisms that perform image-blur correction is limited, for example, in the manner disclosed in Japanese Unexamined Patent Application Publication No. 9-80541.

SUMMARY

When the drive mechanisms use high torque for the image-blur correction, a large amount of current is supplied to the drive mechanisms. However, maximum rated currents are pre-specified for drivers for supplying drive currents to the drive mechanisms and a power-supply unit for supplying power to the drivers. For example, the maximum rated output currents of the driver for supplying drive current to the drive mechanism for correcting image blur in the vertical direction and the driver for supplying drive current to the drive mechanism for correcting image blur in the horizontal direction are assumed to be set to 1.0 ampere. The maximum rated output current of the power-supply unit for supplying power to the drivers is assumed to be set to 1.2 amperes. In this case, when the currents output from the drivers are set to be the same so as not to exceed the maximum rated output current of the power-supply unit, it is desired that the current output from each driver be reduced to 0.6 ampere. It is, therefore, difficult to increase the currents output from the drivers to generate high torque.

Accordingly, it is desirable to provide an image-blur correction device, an image-blur correction method, and an image capture apparatus that allow image-blur correction to be performed in a favorable manner.

According to a first embodiment of the present technology, there is provided an image-blur correction device. The image-blur correction device includes: a drive-current output unit configured to output a first drive current for driving a first correction mechanism for correcting image blur in a first direction orthogonal to an optical axis and a second drive current for driving a second correction mechanism for correcting image blur in a second direction orthogonal to the optical axis and the first direction; and a drive-current limiting unit configured to limit the first drive current to a first limit value, limit the second drive current to a second limit value, limit a total value of the first drive current and the second drive current to a third limit value that is smaller than a total value of the first limit value and the second limit value, vary the first limit value by changing a power-supply time of the first drive current, and vary the second limit value by changing a power-supply time of the second drive current.

In the first embodiment of the present technology, with respect to a first drive current for driving a first correction mechanism for correcting image blur in a first direction orthogonal to an optical axis and a second drive current for driving a second correction mechanism for correcting image blur in a second direction orthogonal to the optical axis and the first direction, the first drive current is limited to a first limit value, the second drive current is limited to a second limit value, a total value of the first drive current and the second drive current is limited to a third limit value that is smaller than a total value of the first limit value and the second limit value. The first limit value is varied by changing a power-supply time of the first drive current, and the second limit value is varied by changing a power-supply time of the second drive current. For example, a power-supply time in which the first drive current is limited to the first limit value may be reduced to thereby increase the first limit value, and a power-supply time in which the second drive current is limited to the second limit value may be reduced to thereby increase the second limit value. The third limit value may be set in accordance with a power supply capability of a power-supply unit that supplies power used for generating the first drive current and the second drive current. The first limit value may be varied in accordance with an amount of current of the first drive current used for correcting the image blur in the first direction, and the second limit value may be varied in accordance with an amount of current of the second drive current used for correcting the image blur in the second direction. Limit values for ensuring minimum drive currents may be set for the first limit value and the second limit value. During limitation of the first drive current and the second drive current, the limitation of one of the first and second drive currents and the limitation of the other drive current may be performed in association with each other. For example, an amount of limitation of the one drive current may be set to an amount of limitation corresponding to an amount of limitation of the other drive current. In addition, correction control signals generated so as to correct the image blur may be limited in accordance with a detection result of the image blur, and the correction control signals may be corrected so that the first drive signal supplied from the drive-current output unit to the first correction mechanism and the second drive signal supplied from the drive-current output unit to the second correction mechanism, the first drive signal and the second drive signal being supplied based on the correction control signals having limit values, have constant current values corresponding to the limit values. In the image-blur correction, limitation is performed on drive currents including a third drive current for driving a third correction mechanism for correcting image blur in a rotation direction about the optical axis.

According to a second embodiment of the present technology, there is provided an image-blur correction method. The image-blur correction method includes: outputting a first drive current for driving a first correction mechanism for correcting image blur in a first direction orthogonal to an optical axis and a second drive current for driving a second correction mechanism for correcting image blur in a second direction orthogonal to the optical axis and the first direction; and limiting the first drive current to a first limit value, limiting the second drive current to a second limit value, limiting a total value of the first drive current and the second drive current to a third limit value that is smaller than a total value of the first limit value and the second limit value, varying the first limit value by changing a power-supply time of the first drive current, and varying the second limit value by changing a power-supply time of the second drive current.

According to a third embodiment of the present technology, there is provided an image capture apparatus. The image capture apparatus includes: an image capture unit configured to generate an image signal of a captured image; a shake detecting unit configured to detect shake of the image capture apparatus; a first correction mechanism configured to correct, in the captured image, image blur in a first direction orthogonal to an optical axis; a second correction mechanism configured to correct, in the captured image, image blur in a second direction orthogonal to the optical axis and the first direction; a drive-current output unit configured to output a first drive current for driving the first correction mechanism and a second drive current for driving the second correction mechanism; and a drive-current limiting unit configured to limit the first drive current to a first limit value, limit the second drive current to a second limit value, and limit a total value of the first drive current and the second drive current to a third limit value that is smaller than a total value of the first limit value and the second limit value, in accordance with a detection result of the image blur, and to vary the first limit value by changing a power-supply time of the first drive current and vary the second limit value by changing a power-supply time of the second drive current.

According to the present technology, with respect to a first drive current for driving a first correction mechanism for correcting image blur in a first direction orthogonal to an optical axis and a second drive current for driving a second correction mechanism for correcting image blur in a second direction orthogonal to the optical axis and the first direction, the first drive current is limited to a first limit value, the second drive current is limited to a second limit value, a total value of the first drive current and the second drive current is limited to a third limit value that is smaller than a total value of the first limit value and the second limit value. In addition, the first limit value is varied by changing the power-supply time of the first drive current. The second limit value is also varied by changing the power-supply time of the second drive current. Accordingly, increasing the limit values by changing the power-supply times makes it possible to supply large drive currents to the correction mechanisms and to perform image-blur correction in a favorable manner.

BRIEF DESCRIPTION OF THE DRAWINGS

FIG. 14 is a flowchart illustrating a third limitation operation; and

DETAILED DESCRIPTION OF EMBODIMENTS

Embodiments for implementing the present technology will be described below. The description will be given in the following order:

1. Example of External Appearance of Image Capture Apparatus
2. Configuration of Image-Blur Correction Device
3. Configuration of Image Capture Apparatus
4. Operation of Image-Blur Correction Control Unit
4-1. First Limitation Operation on Drive Currents
4-2. Second Limitation Operation on Drive Currents
4-3. Third Limitation Operation on Drive Currents
4-4. Other Limitation Operations on Drive Currents
5. Other Configurations and Operations of Image Capture Apparatus <1. Example of External Appearance of Image Capture Apparatus>

Figure 1:
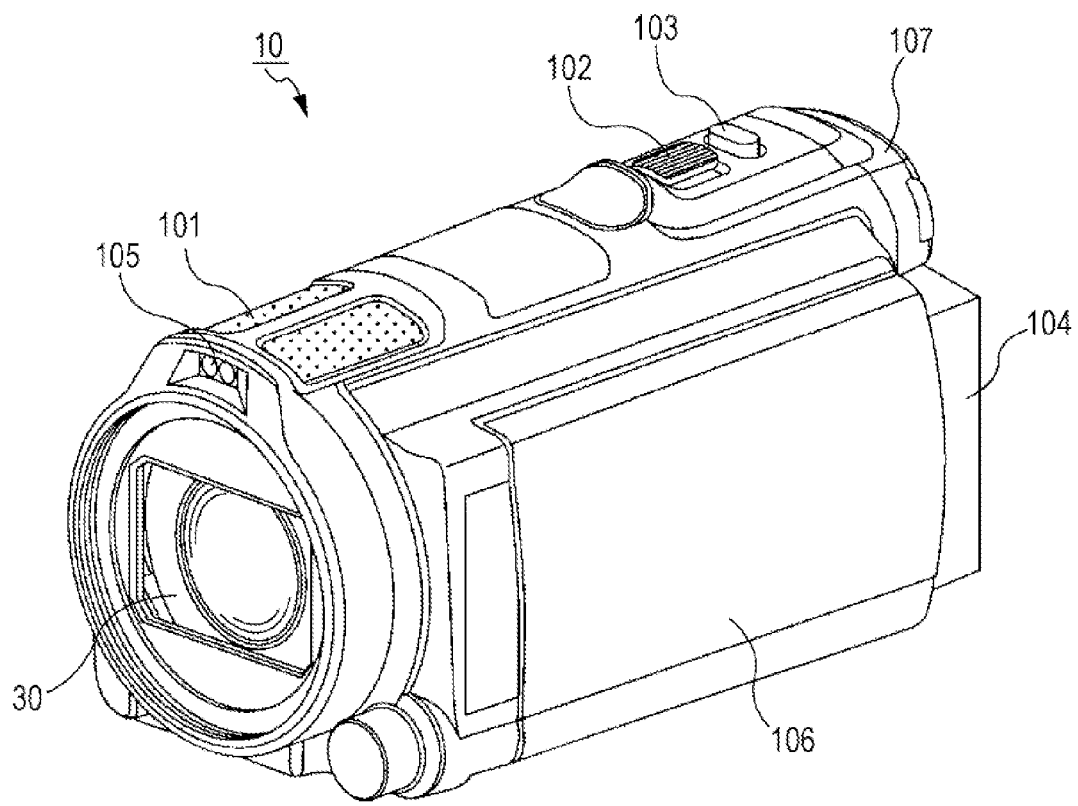
FIG. 1 illustrates an example of the external appearance of an image capture apparatus.

FIG. 1 illustrates an example of the external appearance of an image capture apparatus, for example, a video camera, employing an image-blur correction device according to an embodiment of the present technology. The image-blur correction device according to the embodiment of the present technology can be applied to not only video cameras but also still cameras as well as mobile phones, communication terminal apparatuses, and so on having image-capture functions.

An image capture apparatus 10 has a microphone 101, a zoom lever 102, a shoot button 103, and so on at an upper surface thereof. A battery 104 is fitted in a back surface of the image capture apparatus 10. The image capture apparatus has a flash 105 at a top portion of a front surface thereof. The flash 105 emits fill light forward. A display panel portion 106 is pivotably and rotatably coupled to a side surface portion of the image capture apparatus 10. The image capture apparatus 10 has a lens unit 30 at a front portion thereof. A finder portion 107 is coupled to a back end portion of the image capture apparatus 10.

<2. Configuration of Image-Blur Correction Device>

The image-blur correction device has a lens unit, a shake detecting unit, an image-blur correcting unit, and an image-blur correction control unit. The lens unit has an image-capture optical system and an image capture unit, which generates an image signal of a captured image. The shake detecting unit detects a shake applied to the lens unit. The image-blur correcting unit performs image-blur correction by pivoting the lens unit in a first direction and in a second direction. The first direction is an axial rotation direction of a first pivot axis that is orthogonal to the optical axis of the image-capture optical system, and the second direction is an axial rotation direction of a second pivot axis that is orthogonal to the optical axis and the first pivot axis. In addition, the image-blur correction control unit drives the image-blur correcting unit in accordance with a shake detected by the shake detecting unit.

The image-blur correcting unit is implemented by, for example, a gimbal vibration isolation mechanism for correcting image blur by pivoting the lens unit in a yaw direction and in a pitch direction.

Figure 2:
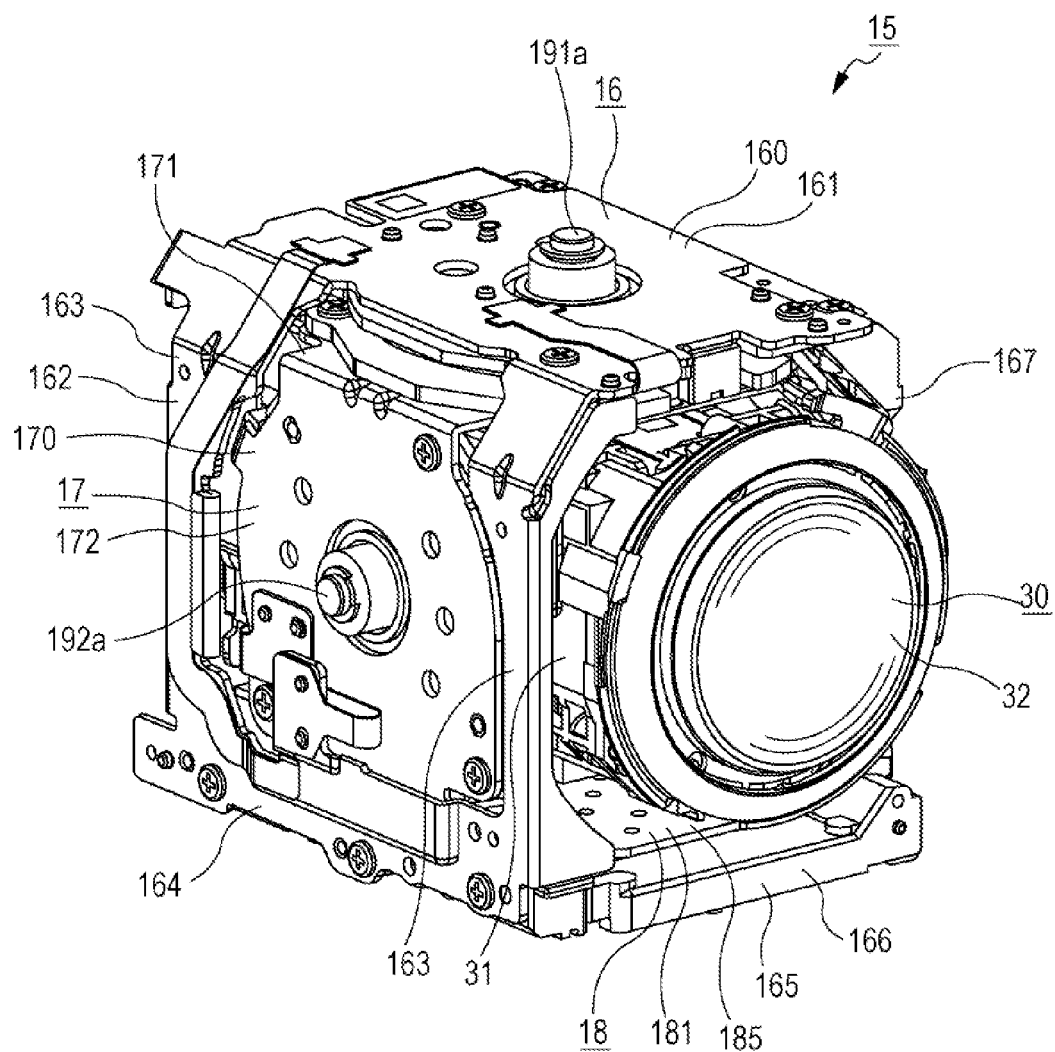
FIG. 2 is a perspective view illustrating a gimbal vibration isolation mechanism.
Figure 3:
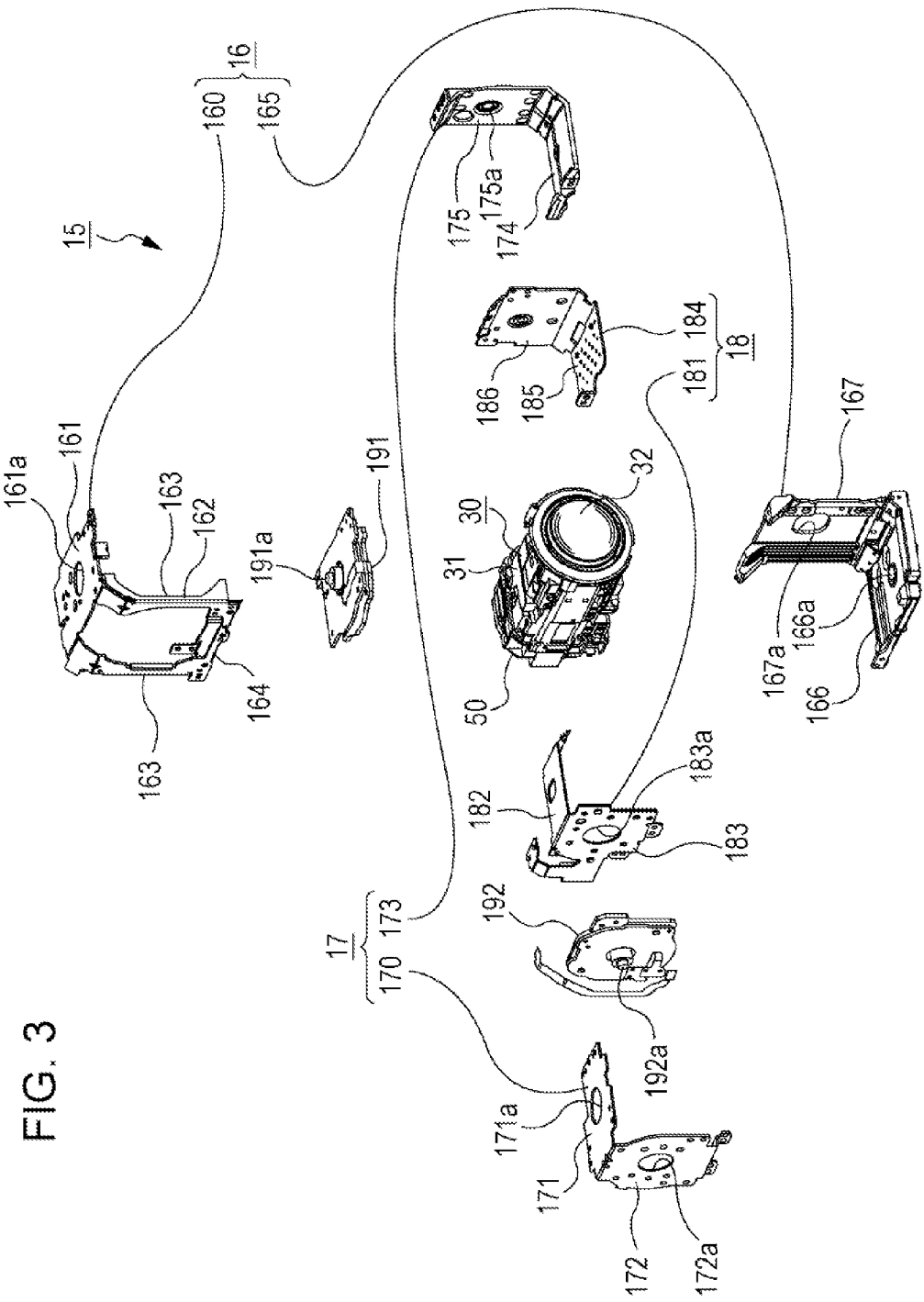
FIG. 3 is an exploded perspective view illustrating the gimbal vibration isolation mechanism.
Figure 4:
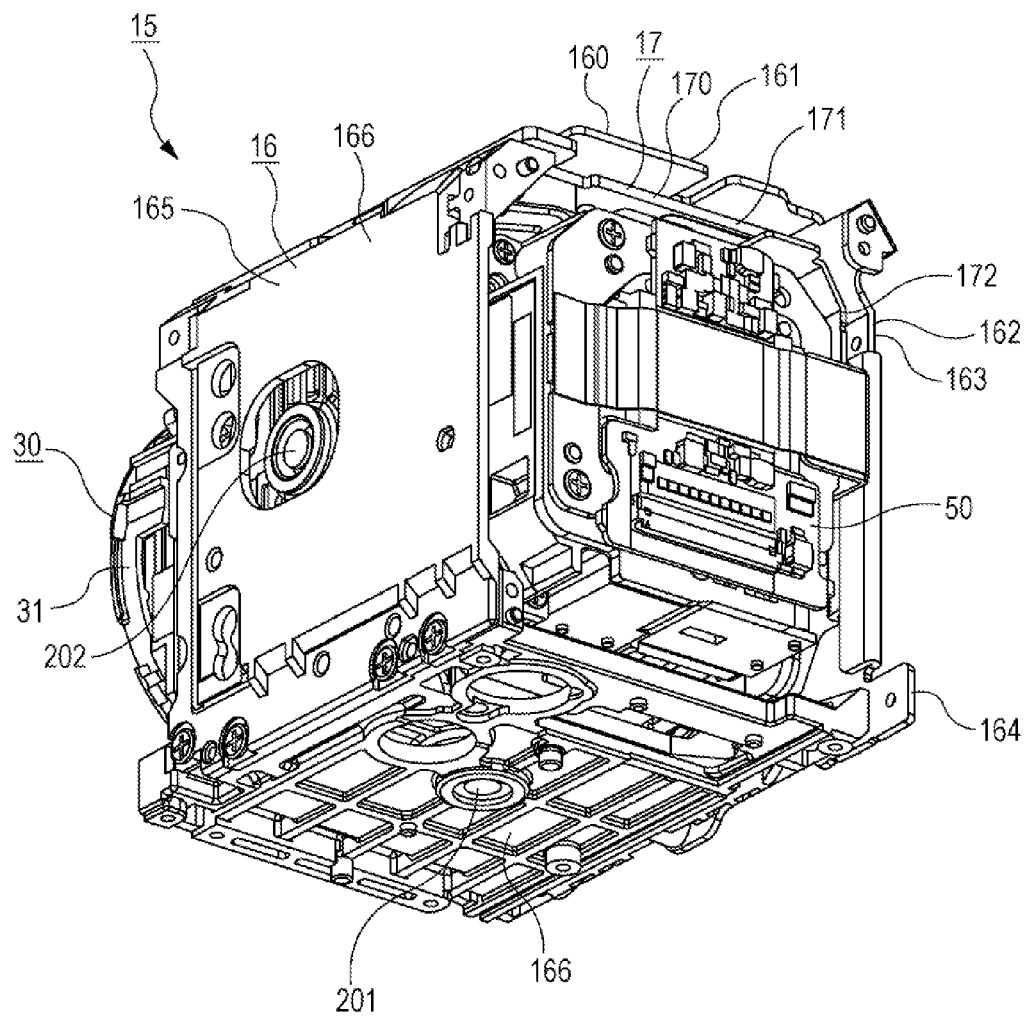
FIG. 4 is a perspective view illustrating the gimbal vibration isolation mechanism viewed in a direction different from that in FIG. 2.
Figure 5:
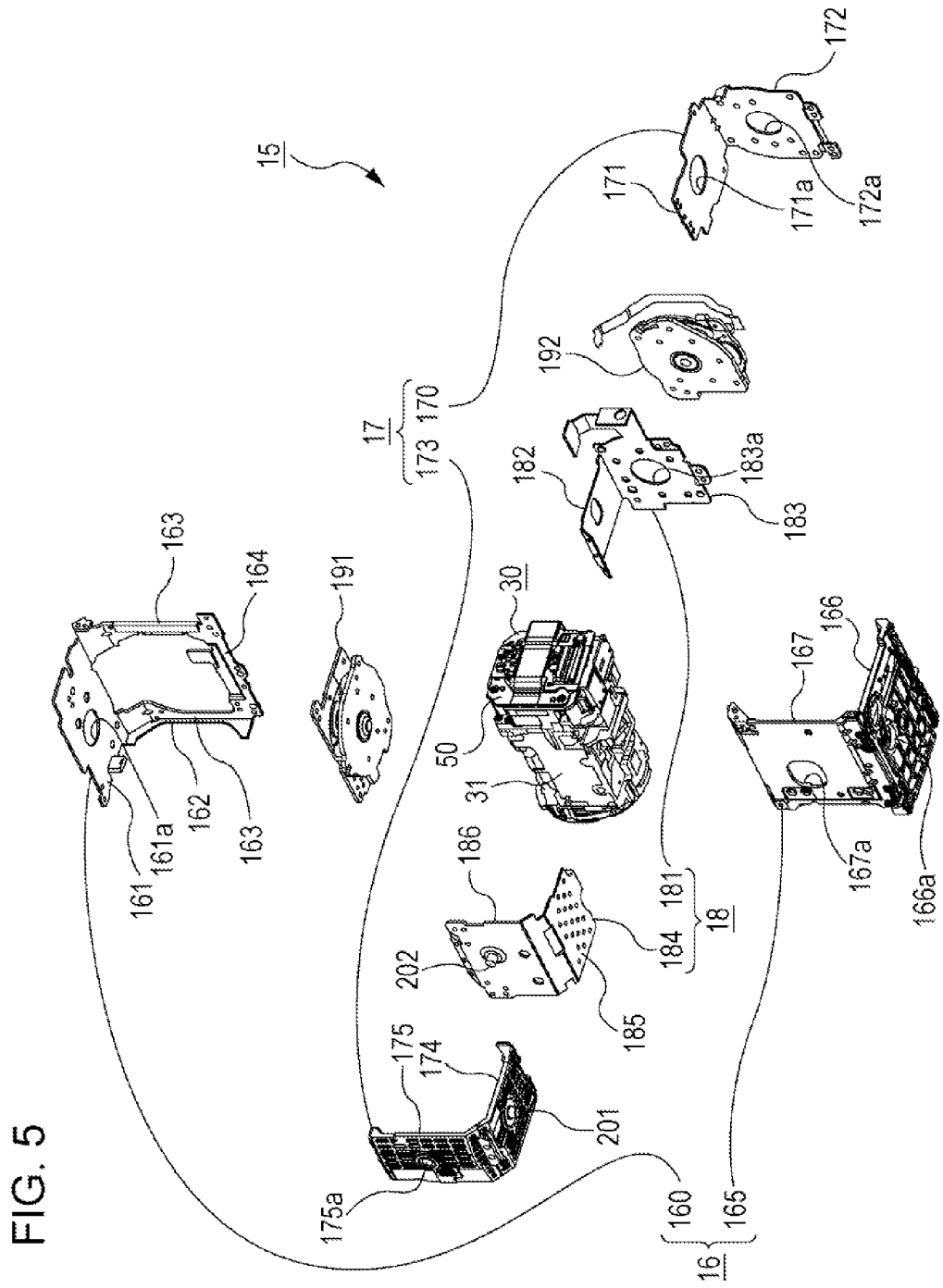
FIG. 5 is an exploded perspective view illustrating the gimbal vibration isolation mechanism viewed from a direction different from that in FIG. 3.

FIGS. 2 and 4 are perspective views of a gimbal vibration isolation mechanism, and FIGS. 3 and 5 are exploded perspective views thereof. A gimbal vibration isolation mechanism 15 has an outer frame 16, an inner frame 17, and a holding frame 18.

The outer frame 16 is constituted by joining a first member 160 and a second member 165.

The first member 160 is constituted by forming, in a continuous manner, a right end portion of a first surface portion 161 that faces in up and down directions and an upper end portion of a second surface portion 162 that faces in left and right directions. The first surface portion 161 has a through hole 161*a* at a center portion thereof. The second surface portion 162 has a pair of columnar portions 163 and a coupling portion 164. The columnar portions 163 are located at the front and back of the second surface portion 162 and extend generally in the up and down directions. The coupling portion 164 extends in the front and back directions and couples lower end portions of the columnar portions 163.

The second member 165 is constituted by forming, in a continuous manner, a left-end portion of a first planar portion 166 that faces in the up and down directions and a second planar portion 167 that faces in the left and right directions. The first planar portion 166 has a placement hole 166*a* at a center portion thereof. The second planar portion 167 has an insertion placement hole 167*a* at a center portion thereof.

A lower end portion of the second surface portion 162 of the first member 160 and a right end portion of the first planar portion 166 of the second member 165 are joined together by screwing or the like.

The inner frame 17 is placed inside the outer frame 16 and is constituted by joining a first supporting member 170 and a second supporting member 173.

The first supporting member 170 is configured by forming, in a continuous manner, a right end portion of a top surface portion 171 that faces in the up and down directions and an upper end portion of a right side-surface portion 172 that faces in the left and right directions. The top surface portion 171 has an insertion placement hole 171*a* at center portion thereof. The right side-surface portion 172 has an insertion hole 172*a* at a center portion thereof.

The second supporting member 173 is constituted by forming, in a continuous manner, a left-end portion of a bottom surface portion 174 that faces in the up and down directions and a lower end portion of a left side-surface portion 175 that faces in the left and right directions. The bottom surface portion 174 has, at a center portion thereof, a fitting hole for fitting a sub shaft 201. The left side-surface portion 175 has a placement hole 175*a* at a center portion thereof.

A lower end portion of the right side-surface portion 172 of the first supporting member 170 and a right end portion of the bottom surface portion 174 of the second supporting member 173 are joined together by screwing or the like. A left-end portion of the top surface portion 171 of the first supporting member 170 and an upper end portion of the left side-surface portion 175 of the second supporting member 173 are joined together by screwing or the like.

The holding frame 18 is placed inside the inner frame 17 and is constituted by joining a first attachment member 181 and a second attachment member 184.

The first attachment member 181 is constituted by forming, in a continuous manner, a right end portion of an upper surface portion 182 that faces in the up and down directions and an upper end portion of a right side-surface portion 183 that faces in the left and right directions. The right side-surface portion 183 has an insertion placement hole 183*a* at a center portion thereof.

The second attachment member 184 is constituted by forming, in a continuous manner, a left-end portion of a lower surface portion 185 that faces in the up and down directions and a lower end portion of a left side-surface portion 186 that faces in the left and right directions. The left side-surface portion 186 has, at a center portion thereof, a fitting hole for fitting a sub shaft 202.

A lower end portion of the right side-surface portion 183 of the first attachment member 181 and a right end portion of the lower surface portion 185 of the second attachment member 184 are joined together by screwing or the like. A left-end portion of the upper surface portion 182 of the first attachment member 181 and an upper end portion of the left side-surface portion 186 of the second attachment member 184 are joined together by screwing or the like.

The lens unit 30 is placed inside the holding frame and includes a lens tube 31, an image-capture optical system 32, and an image capture unit 50. The image-capture optical system 32 is constituted by a plurality of lenses arranged inside the lens tube 31 in the front and back directions. The image capture unit 50 is attached to a back end portion of the image-capture optical system 32 and the lens tube 31. The lens tube 31 has a tube shape that extends in the front and back directions. The image capture unit 50 has an image capture device (not illustrated), such as a charge-coupled device (CCD) or a complementary metal-oxide semiconductor (CMOS).

A first drive motor 191 is provided above the lens unit 30. A second drive motor 192 is also provided to the right of the lens unit 30. The first drive motor 191 and the second drive motor 192 are, for example, flat motors.

The sub shaft 201 is fitted in the fitting hole in the bottom surface portion 174 of the inner frame 17. An upper end portion of the sub shaft 201 is fitted in the fitting hole, and a portion other than the upper end portion thereof protrudes downward from the bottom surface portion 174.

The sub shaft 202 is fitted in the fitting hole in the left side-surface portion 186 of the holding frame 18. A right end portion of the sub shaft 202 is fitted in the fitting hole, and a portion other than the right end portion thereof protrudes from the left side-surface portion 186 leftward.

A bearing is inserted and fitted in the placement hole 166*a* in the first planar portion 166 in the outer frame 16. A bearing is inserted and fitted in the placement hole 175*a* in the left side-surface portion 175 in the inner frame 17.

The holding frame 18 is fixed to an outer peripheral surface of the lens unit 30 by screwing or the like. With the holding frame 18 being fixed to the lens unit 30, frond and back end portions of the lens unit 30 protrude from the corresponding front and back of the holding frame 18.

The second drive motor 192 is provided to the right of the holding frame 18 and is fixed to an outer surface of the right side-surface portion 183 of the holding frame 18 by screwing or the like, and.

The inner frame 17 is provided at a peripheral side of the holding frame 18. With the inner frame 17 being provided at the peripheral side of the holding frame 18, the sub shaft 202 fitted in the left side-surface portion 186 of the holding frame 18 is rotatably supported by the bearing inserted into the placement hole 175*a* in the left side-surface portion 175 of the inner frame 17.

The first drive motor 191 is provided above the inner frame 17 and is fixed to an upper surface of the top surface portion 171 of the inner frame 17 by screwing or the like.

With the outer frame 16 being provided at a peripheral side of the inner frame 17, the sub shaft 201 fitted in the bottom surface portion 174 of the inner frame 17 is rotatably supported by the bearing inserted into the placement hole 166a in the first planar portion 166 of the outer frame 16.

In the gimbal vibration isolation mechanism 15 configured as described above, the aforementioned first pivot axis is an axis connecting a central axis of an output shaft 191a of the first drive motor 191 and a central axis of the sub shaft 201. The aforementioned second pivot axis is an axis connecting a central axis of an output shaft 192a of the second drive motor 192 and a central axis of the sub shaft 202. That is, in the gimbal vibration isolation mechanism 15, when the first drive motor 191 is driven, the lens unit 30 is driven in the yaw direction, and when the second drive motor 192 is driven, the lens unit 30 is driven in the pitch direction. The gimbal vibration isolation mechanism illustrated in FIGS. 2 to 5 is merely exemplary and illustrative, and the image-blur correcting unit may be implemented by a mechanism for correcting image blur through driving of the lens unit, the image capture unit, a correction lens, and so on.

<3. Configuration of Image Capture Apparatus>

Figure 6:
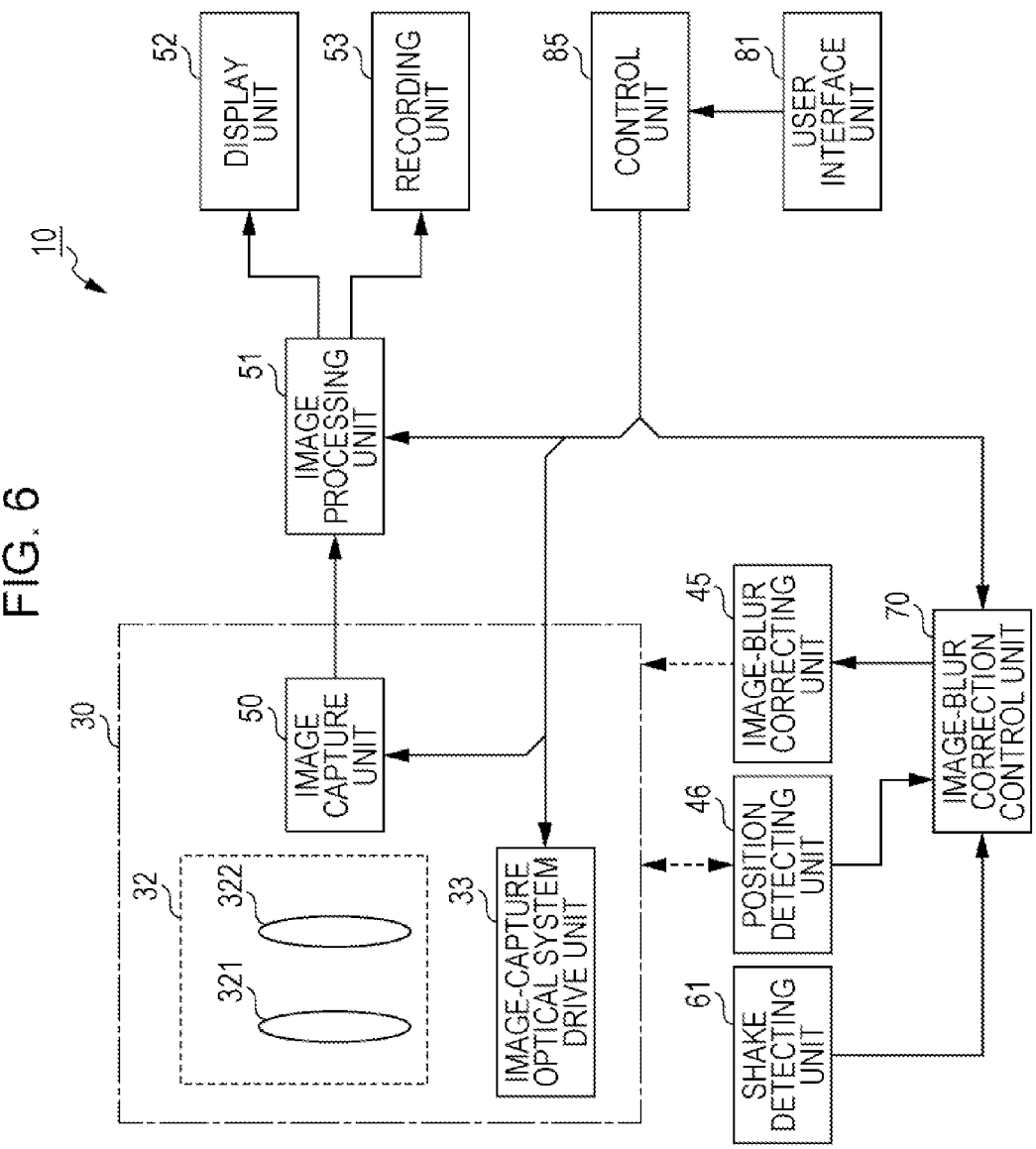
FIG. 6 illustrates the configuration of the image capture apparatus.

FIG. 6 illustrates a configuration of the image capture apparatus 10. The image capture apparatus 10 using the image-blur correction device includes the lens unit 30, an image-blur correcting unit 45, a position detecting unit 46, an image processing unit 51, a display unit 52, a recording unit 53, a shake detecting unit 61, an image-blur correction control unit 70, a user interface unit 81, and a control unit 85.

The lens unit 30 includes the image-capture optical system 32, an image-capture optical system drive unit 33, and the image capture unit 50.

The image-capture optical system 32 includes a focus lens 321, a zoom lens 322, and so on. The image-capture optical system 32 performs focus adjustment, for example, by moving the focus lens 321 in optical-axis directions. The image-capture optical system 32 also varies a focal distance by moving the zoom lens 322 in the optical-axis directions.

The image-capture optical system drive unit 33 drives the focus lens 321 and the zoom lens 322 on the basis of a control signal from the control unit 85 (described below).

The image capture unit 50 includes an image capture device, a preprocessing unit, an image-capture drive unit, and so on. The image capture device performs photoelectric conversion processing to convert an optical image, formed on an image capture plane by the image-capture optical system 32, into an electrical signal. The image capture device is implemented by, for example, a charge-coupled device (CCD) image sensor or a complementary metal-oxide semiconductor (CMOS) image sensor. The preprocessing unit performs noise removal processing, such as correlated double sampling (CDS), on the electrical signal generated by the image capture device. The preprocessing unit performs gain adjustment for setting a signal level of the electrical signal to a desired signal level. In addition, the preprocessing unit performs analog-to-digital (A/D) conversion processing to convert an analog image signal, which is an electrical signal subjected to the noise removal processing and the gain adjustment, into a digital image signal, and outputs the digital image signal to the image processing unit 51. On the basis of a control signal from the control unit 85 (described below), the image-capture drive unit generates, for example, operation pulses used for driving the image capture device. For example, the image-capture drive unit generates a charge read pulse for reading charge, a transfer pulse for performing vertical and horizontal transfer, and a shutter pulse for performing an electronic shutter operation, and so on.

On the basis of a drive current supplied from the image-blur correction control unit 70, the image-blur correcting unit 45 rotates the lens unit 30 in the yaw direction and the pitch direction, as described above. The position detecting unit 46 generates detection signals corresponding to the position of the lens unit 30 and outputs the generated detection signals to the image-blur correction control unit 70. For example, the detection signals output to the image-blur correction control unit 70 are signals generated by hall effect devices 46ya (46yb) and 46pa (46pb).

The image processing unit 51 performs, for example, camera-process processing on the digital image signal output from the image capture unit 50. The image processing unit 51 performs, for example, color correction processing, contour enhancement processing, and nonlinear processing, such as gamma correction and knee correction, on the image signal. The image processing unit 51 outputs an image signal resulting from the processing to the display unit 52 and/or the recording unit 53.

The display unit 52 serves as a display panel and an electronic viewfinder and, for example, displays a through-the-camera-lens image on the basis of the image signal output from the image processing unit 51. The display unit 52 also performs menu display, operating-state display, and so on for operation setting of the image capture apparatus 10. When the number of display pixels is smaller than that of a captured image, the display unit 52 performs processing for converting the captured image into a display image corresponding to the number of display pixels.

The recording unit 53 records the image signal, output from the image processing unit 51, to a recording medium. The recording medium may be, for example, a detachable medium, such as a memory card, an optical disk, or a magnetic tape, as well as a fixed-type hard disk drive (HDD) or a semiconductor memory module. The recording unit 53 may be provided with an encoder and a decoder to perform compression encoding and decompression decoding on the image signal to record an encoded signal to the recording medium. The recording unit 53 may also be configured to read an image signal or an encoded signal recorded on the recording medium and to display a recorded image on the display unit 52.

The shake detecting unit 61 is implemented by a sensor, for example, an acceleration sensor or gyro-sensor, for detecting a shake applied to the image capture apparatus 10 (the lens unit 30). The shake detecting unit 61 detects a shake applied to the image capture apparatus 10 (the lens unit 30) and outputs a detection result to the image-blur correction control unit 70.

The image-blur correction control unit 70 generates a drive current on the basis of the shake detected by the shake detecting unit 61 and a lens unit 30 position detected by the position detecting unit 46. The image-blur correction control unit 70 supplies the generated drive current to the image-blur correcting unit 45, so as to allow the image capture unit 50 to generate an image signal of a captured image in which image blur is corrected.

The user interface unit 81 includes the zoom lever, the shoot button, and so on. The user interface unit 81 generates an operation signal corresponding to a user operation and outputs the generated operation signal to the control unit 85.

The control unit 85 includes, for example, a central processing unit (CPU), a read only memory (ROM), and a random access memory (RAM). The CPU reads a control program stored in the ROM and executes the control program, as appropriate. The ROM pre-stores therein programs executed by the CPU, data used for various types of processing, and so on. The RAM is a memory used as a so-called "work area" for temporarily storing results obtained during processing. The ROM or the RAM also stores therein various types of control information, correction data, and so on. In accordance with operation signals and so on from the user interface unit 81, the control unit 85 controls various units to cause the image capture apparatus 10 to perform an operation corresponding to a user operation. The control unit 85 also controls the image-blur correction control unit 70 to cause it to perform image-blur correction operation.

Figure 7:
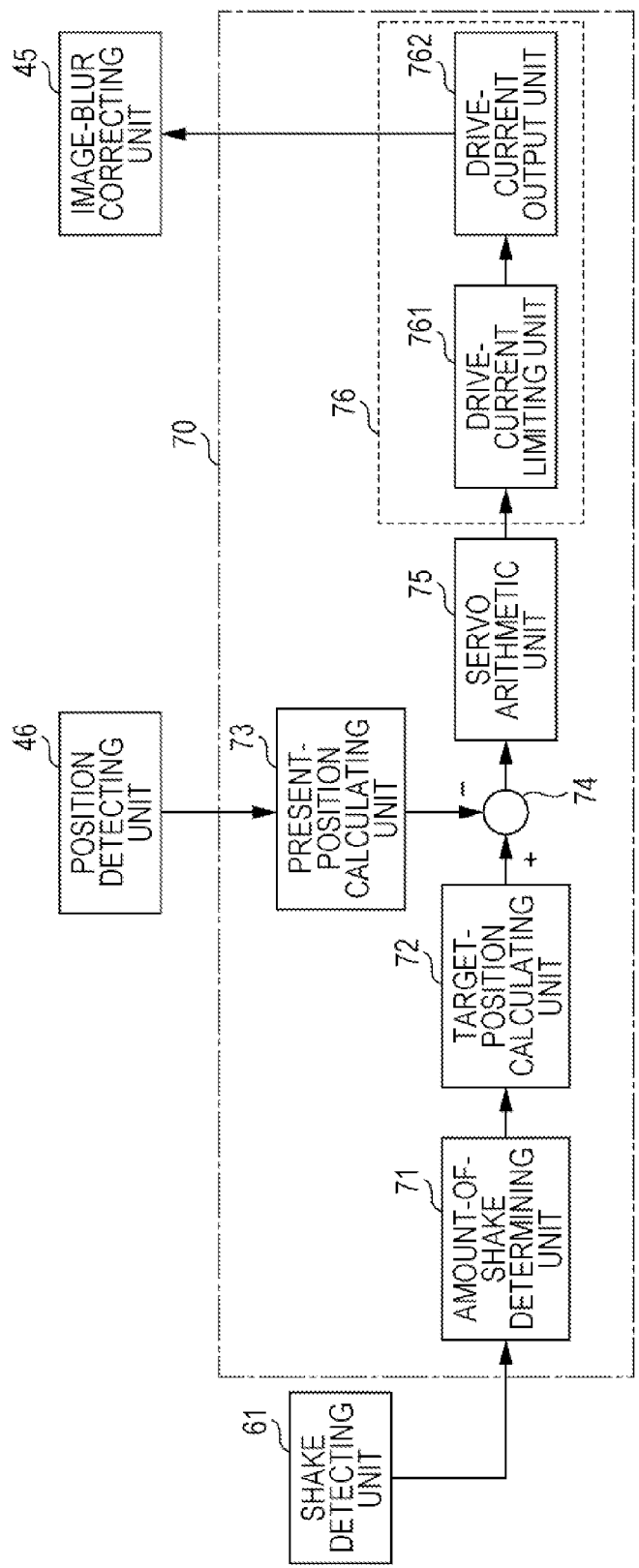
FIG. 7 illustrates the configuration of an image-blur correction control unit.

FIG. 7 illustrates the configuration of the image-blur correction control unit 70. The image-blur correction control unit 70 includes an amount-of-shake determining unit 71, a target-position calculating unit 72, a present-position calculating unit 73, an arithmetic unit 74, a servo arithmetic unit 75, and a drive unit 76.

The amount-of-shake determining unit 71 determines the amount of shake applied to the image capture apparatus 10 (the lens unit 30), on the basis of a detection signal supplied from the shake detecting unit 61. The amount-of-shake determining unit 71 outputs the determined amount of shake to the target-position calculating unit 72.

On the basis of the amount of shake determined by the amount-of-shake determining unit 71, the target-position calculating unit 72 calculates a lens unit 30 position at which the image capture unit 50 can generate an image signal of a captured image having no image blur, and outputs the calculated position to the arithmetic unit 74 as a target position.

The present-position calculating unit 73 calculates the present position of the lens unit 30 on the basis of detection signals from the position detecting unit 46, for example, detection signals generated by the hall effect devices 46ya (46yb) and 46pa (46pb). The present-position calculating unit 73 outputs the calculated present position to the arithmetic unit 74.

The arithmetic unit 74 calculates an error between the target position and the present position and outputs a position error signal indicating the amount of the calculated error to the servo arithmetic unit 75.

The servo arithmetic unit 75 generates correction control signals so that the amount of error calculated by the arithmetic unit 74 reaches "0" and outputs the generated correction control signals to the drive unit 76.

On the basis of the correction control signal from the servo arithmetic unit 75, the drive unit 76 generates a first drive current for driving a first correction mechanism in the gimbal vibration isolation mechanism 15, for example, the first drive motor 191 in the image-blur correcting unit 45. The drive unit 76 also generates a second drive current for driving a second correction mechanism in the gimbal vibration isolation mechanism 15, for example, the second drive motor 192 in the image-blur correcting unit 45. The drive unit 76 outputs the generated first drive current to the first correction mechanism and outputs the generated second drive current to the second correction mechanism. As described above, the drive unit 76 generates drive currents on the basis of the correction control signals supplied from the servo arithmetic unit 75. The drive unit 76 also supplies the generated drive currents to the image-blur correcting unit 45 to thereby cause the image-blur correcting unit 45 to drive the lens unit 30 so that the lens unit 30 reaches the target position calculated by the target-position calculating unit 72.

In addition, the drive unit 76 limits the first drive current to a first limit value, limits the second drive current to a second limit value, and limits a total value of the first drive current and the second drive current to a third limit value that is smaller than the total value of the first limit value and the second limit value. The drive unit also varies the first limit value by changing a power-supply time of the first drive current and varies the second limit value by changing a power-supply time of the second drive current.

The drive unit 76 has, for example, a drive-current limiting unit 761 and a drive-current output unit 762. The drive-current limiting unit 761 performs limitation operation on the correction control signals from the servo arithmetic unit 75. In the limitation operation, the drive-current limiting unit 761 limits the first drive current to the first limit value, limits the second drive current to the second limit value, and limits the total value of the first drive current and the second drive current to the third limit value that is smaller than the total value of the first limit value and the second limit value. The drive-current limiting unit 761 also varies the first limit value by changing the power-supply time of the first drive current and varies the second limit value by changing the power-supply time of the second drive current. For example, the drive-current limiting unit 761 increases the first limit value by reducing the power-supply time in which the first drive current is limited to the first limit value and increases the second limit value by reducing the power-supply time in which the second drive current is limited to the second limit value. The drive-current limiting unit 761 outputs correction control signals subjected to the limitation operation to the drive-current output unit 762.

On the basis of the correction control signals limited by the drive-current limiting unit 761, the drive-current output unit 762 generates a first drive current and a second drive current and outputs the generated drive currents to the image-blur correcting unit 45.

As described above, on the basis of the detection result of the shake detecting unit 61 and the present position of the lens unit 30, the image-blur correction control unit 70 performs feedback control so as to allow the image capture unit 50 to generate an image signal of a captured image in which image blur is corrected.

<4. Operation of Image-Blur Correction Control Unit>

Figure 8:
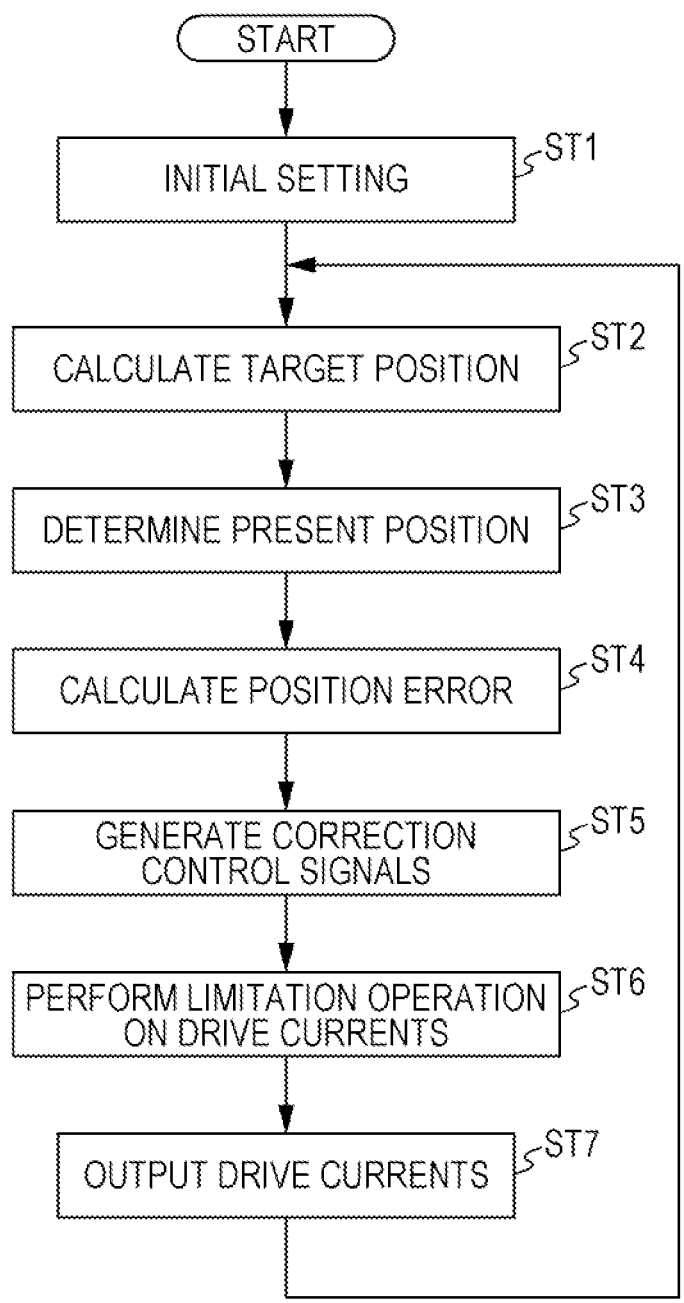
FIG. 8 is a flowchart illustrating an operation of the image-blur correction control unit.

FIG. 8 is a flowchart illustrating an operation of the image-blur correction control unit 70. In step ST1, the image-blur correction control unit 70 performs initial setting. More specifically, the image-blur correction control unit 70 performs initial setting for parameters used for servo arithmetic operation, limit values and limit times used for limiting the correction control signals, and so on. The process then proceeds to step ST2.

In step ST2, the image-blur correction control unit 70 calculates a target position. More specifically, on the basis of a detection signal supplied from the shake detecting unit 61, the image-blur correction control unit 70 calculates the amount of shake applied to the image capture apparatus 10 (the lens unit 30). On the basis of the calculated amount of shake, the image-blur correction control unit 70 calculates, as a target position, a lens unit 30 position at which the image capture unit 50 can generate an image signal of a captured image having no image blur. The process then proceeds to step ST3.

In step ST3, the image-blur correction control unit determines a present position. More specifically, the image-blur correction control unit 70 obtains detection signals from the position detecting unit 46 and calculates and determines the present position of the lens unit 30 on the basis of the obtained detection signals. The process then proceeds to step ST4.

In step ST4, the image-blur correction control unit 70 calculates a position error. More specifically, the image-blur correction control unit 70 calculates an error between the target position and the present position and generates a position error signal indicating the calculated error. The process then proceeds to step ST5.

In step ST5, the image-blur correction control unit generates correction control signals. For example, the image-blur correction control unit 70 generates a proportional control signal by multiplying the position error signal by a proportional gain. The image-blur correction control unit 70 also generates a differential control signal by multiplying a differentiation signal of the position error signal by a differential gain. The image-blur correction control unit 70 generates an integral control signal by multiplying an integral signal of the position error signal by an integral gain. The image-blur correction control unit 70 further adds the proportional control signal, the differential control signal, and the integral control signal to generate a control signal and sets the control signal as a correction control signal used for generating each drive current. The process then proceeds to step ST6.

In step ST6, the image-blur correction control unit 70 performs limitation operation on the drive currents. For example, the image-blur correction control unit 70 performs limitation so that the first drive current for driving the first drive motor 191 in the gimbal vibration isolation mechanism 15 does not exceed the first limit value. The image-blur correction control unit 70 also performs limitation so that the second drive current for driving the second drive motor 192 in the gimbal vibration isolation mechanism 15 does not exceed the second limit value. The image-blur correction control unit 70 further performs limitation so that the total value of the first drive current and the second drive current does not exceed the third limit value. The process then proceeds to step ST7. In the drive-current limitation processing, the image-blur correction control unit 70 limits, for example, signal levels and times of the correction control signals generated in step ST5 so that the drive currents do not exceed the corresponding limit values.

In step ST7, the image-blur correction control unit 70 outputs the drive currents. More specifically, the image-blur correction control unit 70 supplies the first drive current and the second drive current, subjected to the limitation processing, to the corresponding first and second drive motors 191 and 192 to cause the image-blur correcting unit 45 to drive the lens unit 30, thereby correcting the shake applied to the image capture apparatus 10 (the lens unit 30). The process then returns to step ST2. Any of the process in step ST2 and the process in step ST3 may be performed earlier.

[4-1. First Limitation Operation on Drive Currents]

Next, a first limitation operation on drive currents, the limitation operation being performed by the image-blur correction control unit 70, will be described in detail. The drive unit 76 in the image-blur correction control unit 70 includes, for example, the drive-current limiting unit 761 and the drive-current output unit 762, as described above. The drive-current output unit 762 is implemented by, for example, a semiconductor device or the like (hereinafter referred to as a "drive device") for driving the motors. The drive-current limiting unit 761 limits the correction control signals so that each of the first drive current and the second drive current does not exceed a maximum rated output current and a maximum rated output peak current of the drive device. During output of the first drive current and the second drive current, the drive-current limiting unit 761 also limits the correction control signals so that a rated value of a power-supply unit that supplies power to the drive-current output unit 762 is not exceeded. In addition, during limitation of the correction control signals so that the maximum rated output peak current is not exceeded, the drive-current limiting unit 761 limits the time for the maximum rated output peak current so that it does not exceed a pre-specified peak-current limit time. By limiting the time so that it does not exceed the peak-current limit time, that is, by reducing the power-supply time in which the drive current is limited to the limit value, it is possible to achieve a limit value corresponding to the maximum rated output peak current, which is a current larger than the maximum rated output current. For the limitation operation on the correction control signals, the limit values may also be set so that values obtained after derating the maximum rated output current, the maximum rated output peak current, and so on are not exceeded. Such an arrangement allows the limitation operation to be performed with margins for the maximum rated values.

Figure 9:
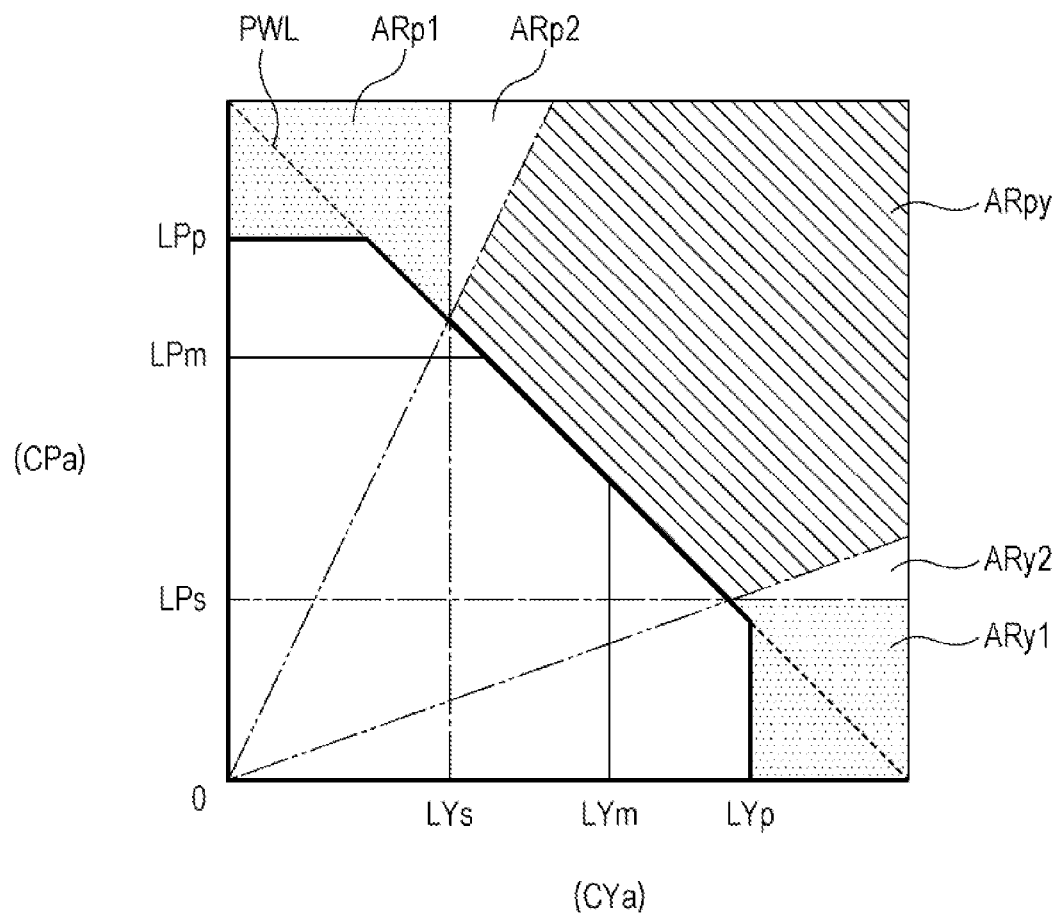
FIG. 9 illustrates a limitation operation performed on a correction control signal.

FIG. 9 illustrates the limitation operation performed on the correction control signals. The drive unit 76 limits the first drive current to the first limit value by limiting a signal level of a correction control signal CYa and limits the second drive current to the second limit value by limiting a signal level of a correction control signal CPa. The drive unit 76 further limits the first drive current and the second drive current to the third limit value by limiting the signal levels of the correction control signals CYa and CPa.

In FIG. 9, a limit line PWL (indicated by a dashed line) represents limit values of the correction control signals when the first drive current and the second drive current are limited to the third limit value. In order to limit the first drive current to the first limit value, for example, an output-current limit value LYm, a peak-current limit value LYp, and a minimum-current limit value LYs are provided for the correction control signal CYa. In order to limit the second drive current to the second limit value, for example, an output-current limit value LPm, a peak-current limit value LPp, and a minimum-current limit value LPs are provided for the correction control signal CPa.

The output-current limit value LYm is a limit value for limiting the correction control signal CYa so that the first drive current does not exceed the maximum rated output current.

The peak-current limit value LYp is a limit value for limiting the correction control signal CYa so that the first drive current does not exceed, for example, the maximum rated output peak current (a current that can be output in a pre-specified short period of time).

The minimum-current limit value LYs is a limit value for limiting the correction control signal CYa so that, even during the shake correction in the pitch direction, a minimum level of the first drive current is ensured and the shake correction effect in the yaw direction is obtained. For example, when the first drive current and the second drive current are limited since the drive currents to be used are large, and the limited first drive current is too small, there is a possibility that the shake correction in the yaw direction is not performed when the shake correction is performed in the pitch direction. Thus, when the correction control signal CYa corresponding to the first drive current used for the shake correction is larger than or equal to the minimum-current limit value LYs, even if the first drive current and the second drive current are limited, the first drive current corresponding to the correction control signal CYa having the minimum-current limit value LYs is output. Such an arrangement allows for the shake correction in the yaw direction.

The output-current limit value LPm is a limit value for limiting the correction control signal CPa so that the second drive current does not exceed, for example, the maximum rated output current.

The peak-current limit value LPp is a limit value for limiting the correction control signal CPa so that the second drive current does not exceed, for example, the maximum rated output peak current (a current that can be output in a pre-specified short period of time).

The minimum-current limit value LPs is a limit value for limiting the correction control signal CPa so that, even during the shake correction in the yaw direction, a minimum second drive current is ensured and the shake correction effect in the pitch direction is obtained. For example, when the first drive current and the second drive current are limited since drive currents to be used are large, and the limited second drive current is too small, there is a possibility that vertical movement in the image capture direction by the weight of the gimbal vibration isolation mechanism 15, the lens unit 30, and so on is not corrected. Thus, when the correction control signal CPa corresponding to the second drive current to be used for the shake correction is larger than or equal to the minimum-current limit value LPs, even if the first drive current and the second drive current are limited, the second drive current corresponding to the correction control signal CPa having the minimum-current limit value LPs is output. Such an arrangement allows for the shake correction in the pitch direction.

In FIG. 9, an area ARy1 is an area in which the signal level of the correction control signal CYa is larger than the limit line PWL or the peak-current limit value LYp and the correction control signal CPa is smaller than the minimum-current limit value LPs.

An area ARp1 is an area in which the signal level of the correction control signal CPa is larger than the limit line PWL or the peak-current limit value LPp and the correction control signal CYa is smaller than the minimum-current limit value LYs.

An area ARy2 is, in an area in which the signal level of the correction control signal CYa is larger than the limit line PWL and the signal level of the correction control signal CPa is larger than or equal to the minimum-current limit value LPs, an area in which a multiplication result obtained by multiplying a reduction rate kp, with which the signal level of the correction control signal CPa is the minimum-current limit value LPs, by the signal level of the correction control signal CYa is larger than the limit line PWL.

An area ARp2 is, in an area in which the signal level of the correction control signal CPa is larger than the limit line PWL and the signal level of the correction control signal CYa is larger than or equal to the minimum-current limit value LYs, an area in which a multiplication result obtained by multiplying a reduction rate ky, with which the signal level of the correction control signal CYa is the minimum-current limit value LYs, by the signal level of the correction control signal CPa is larger than the limit line PWL.

An area ARpy is an area obtained by removing the area ARy2 and the area ARp2 from an area in which the signal levels of the correction control signals CYa and CPa are larger than the limit line PWL, the signal level of the correction control signal CYa is larger than or equal to the minimum-current limit value LYs, and the signal level of the correction control signal CPa is larger than or equal to the minimum-current limit value LPs.

The drive-current limiting unit 761 performs limitation operation on the correction control signals CYa and CPa from the servo arithmetic unit 75. In the limitation operation, the drive-current limiting unit 761 limits the signal levels so that the first drive current does not exceed the first limit value, the second drive current does not exceed the second limit value, and the total value of the first drive current and the second drive current does not exceed the third limit value. The drive-current limiting unit 761 also performs the limitation operation so that the corresponding power-supply times are not exceeded. The drive-current limiting unit 761 supplies correction control signals CYb and CPb resulting from the limitation to the drive-current output unit 762 to cause it to output the first drive current and the second drive current.

In this case, when the signal levels of the correction control signals CYa and CPa are in the region ARy1, the signal level of only the correction control signal CYa is limited. In the signal level limitation, when the correction control signal CYa exceeds the output-current limit value LYm, the correction control signal CYa is limited to a value that is smaller than or equal to the peak-current limit value LYp within a preset limit time. When the time in which the correction control signal CYa exceeds the output-current limit value LYm exceeds the limit time, the correction control signal CYa is limited to a value that is smaller than or equal to the output-current limit value LYm.

When the signal levels of the correction control signals CYa and CPa are in the region ARp1, the signal level of only the correction control signal CPa is limited. In the signal level limitation, when the correction control signal CPa exceeds the output-current limit value LPm, the correction control signal CPa is limited to a value that is smaller than or equal to the peak-current limit value LPp within a preset limit time. When the time in which the correction control signal CPa exceeds the output-current limit value LPm exceeds the limit time, the correction control signal CPa is limited to the output-current limit value LPm.

When the signal levels of the correction control signals CYa and CPa are in the region ARy2, the correction control signal CPa is set to the minimum-current limit value LPs. The correction control signal CYa is limited according to the limit value for the correction control signal CYa when the correction control signal CPa has the minimum-current limit value LPs. In this case, when the limit value for the correction control signal CYa exceeds the output-current limit value LYm, the correction control signal CYa is set to a value that is smaller than or equal to the peak-current limit value LYp within a preset limit time. When the time in which the limit value for the correction control signal CYa exceeds the output-current limit value LYm exceeds the limit time, the correction control signal CYa is limited to the output-current limit value LYm.

When the signal levels of the correction control signals CYa and CPa are in the region ARp2, the correction control signal CYa is set to the minimum-current limit value LYs. The correction control signal CPa is limited according to the limit value for the correction control signal CPa when the correction control signal CYa has the minimum-current limit value LYs. In this case, when the limit value for the correction control signal CPa exceeds the output-current limit value LPm, the correction control signal CPa is limited to a value that is smaller than or equal to the peak-current limit value LPp within a preset limit time. When the time in which the limit value for the correction control signal CPa exceeds the output-current limit value LPm exceeds the limit time, the correction control signal CPa is limited to the output-current limit value LPm.

When the signal levels of the correction control signals CYa and CPa are in the area ARpy, the limitation of one drive current and the limitation of the other drive current are performed in association with each other. For example, the signal levels of the correction control signals CYa and CPa are multiplied by the same reduction rate to limit the correction control signals CYa and CPa so that they are smaller than or equal to the limit line PWL and are smaller than or equal to the corresponding output-current limit values LYm and LPm. In the signal level limitation, when the correction control signal CYa exceeds the output-current limit value LYm, the correction control signal CYa is limited to a value that is smaller than or equal to the peak-current limit value LYp within a preset limit time. After the limit time elapses, the correction control signal CYa is limited to a value that is smaller than or equal to the output-current limit value LYm. When the correction control signal CPa exceeds the output-current limit value LPm, the correction control signal CPa is limited to a value that is smaller than or equal to the peak-current limit value LPp within a preset limit time. After the limit time elapses, the correction control signal CPa is limited to the output-current limit value LPm.

Figure 10:
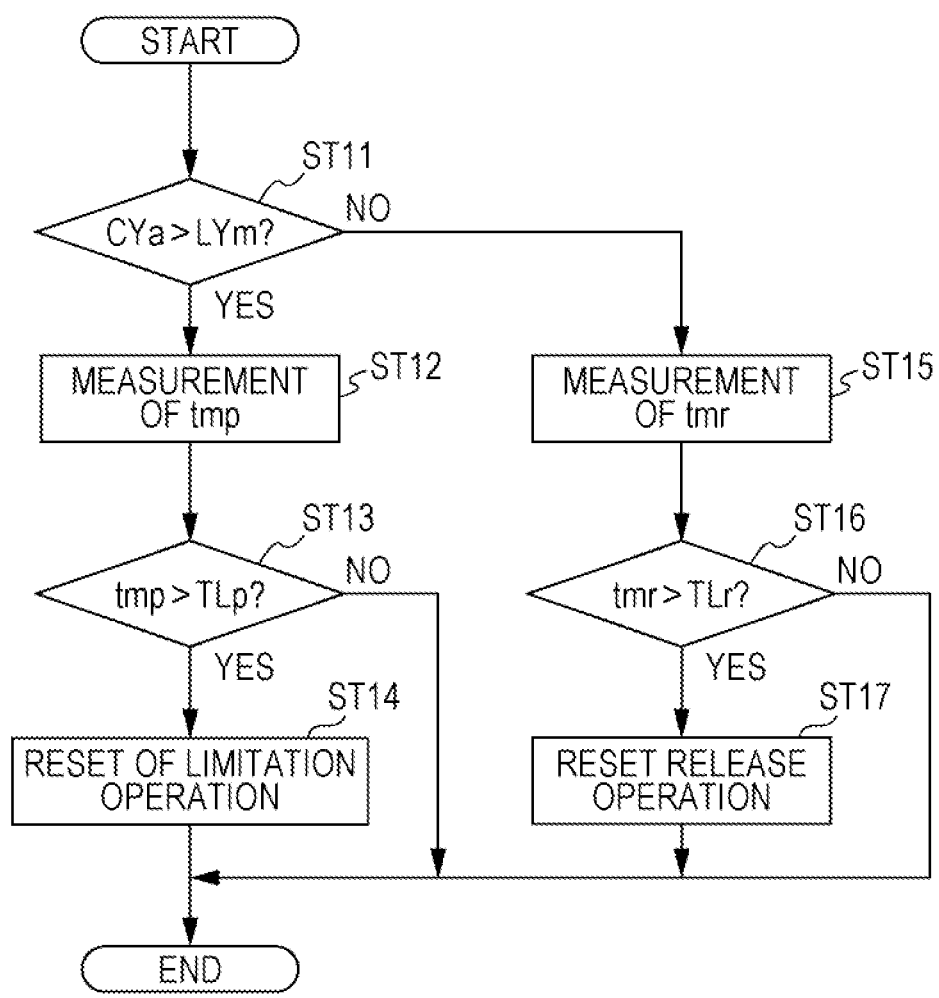
FIG. 10 is a flowchart illustrating the limitation operation on correction control signals.

Next, the limitation operation on the correction control signals will be described with reference to a flowchart illustrated in FIG. 10. FIG. 10 illustrates a case for the correction control signal CYa. In the initial setting in step ST1 described above and illustrated in FIG. 8, for example, the peak-current limit value LYp is set so that it does not exceed the maximum rated output peak current value (the current value in a peak-current limit time Tp). A limit time TLp of the limitation operation using the peak-current limit value LYp is also set to the peak-current limit time Tp. In addition, "0" is set for a limit elapsed time tmp in which the limitation operation using the peak-current limit value LYp is performed and for a reset elapsed time tmr in which the limitation operation is reset.

In step ST11, the drive unit 76 determines whether or not the correction control signal CYa supplied from the servo arithmetic unit 75 exceeds the output-current limit value LYm. When the correction control signal CYa exceeds the output-current limit value LYm, the process of the drive unit proceeds to step ST12, and when the correction control signal CYa does not exceed the output-current limit value LYm, the process proceeds to step ST15.

In step ST12, the drive unit 76 measures the limit elapsed time tmp. More specifically, the drive unit 76 starts the limitation operation for limiting the correction control signal CYa to a value that is smaller than or equal to the peak-current limit value LYp and measures the limit elapsed time tmp. During the limitation operation, the drive unit 76 continues the measurement of the limit elapsed time tmp. In addition, during the limitation operation, the drive unit 76 sets "0" for the reset elapsed time tmr, which is the time in which the limitation operation is reset. The process then proceeds to step ST13.

In step ST13, the drive unit 76 determines whether or not the limit elapsed time tmp has exceeded the limit time TLp. When the limit elapsed time tmp has exceeded the limit time TLp, the process of the drive unit 76 proceeds to step ST14, and when the limit elapsed time tmp has not exceeded the limit time TLp, the process proceeds to step ST7 in FIG. 8.

In step ST14, the drive unit 76 resets the limitation operation. That is, the drive unit 76 ends the limitation operation for limiting the correction control signal CYa to a value that is smaller than or equal to the peak-current limit value LYp and changes the limit value from the peak-current limit value LYp to a reset limit value LYr, which is a limit value during a reset operation. The drive unit 76 also ends the measurement of the limit elapsed time tmp, and then the process proceeds to step ST7 in FIG. 8. The reset limit value LYr is set to, for example, the output-current limit value LYm so that the first drive current does not exceed the maximum rated output current.

When the process proceeds from step ST11 to step ST15, the drive unit 76 measures the reset elapsed time tmr. The drive unit 76 starts the reset operation for limiting the correction control signal CYa to a value that is smaller than or equal to the reset limit value LYr and measures the reset elapsed time tmr. During the reset operation, the drive unit 76 also continues the measurement of the reset elapsed time tmr. In addition, during the reset operation, the drive unit 76 sets "0" for the limit elapsed time tmp. The process then proceeds to step ST16.

In step ST16, the drive unit 76 determines whether or not the reset elapsed time tmr has exceeded a preset reset end time TLr. When the reset elapsed time tmr has exceeded the reset end time TLr, the process of the drive unit 76 proceeds to step ST17, and when the reset elapsed time tmr has not exceeded the preset reset end time TLr, the process proceeds to step ST7 in FIG. 8. The reset end time TLr is a time from when the limitation operation is performed until a next limitation operation can be performed, and is pre-determined according to a rated value of the drive-current output unit 762 or the like.

In step ST17, the drive unit 76 performs a reset release operation. That is, the drive unit 76 ends the reset operation for limiting the correction control signal CYa to a value that is smaller than or equal to the reset limit value LYr and changes the limit value from the reset limit value LYr to the peak-current limit value LYp. The drive unit 76 also ends the measurement of the reset elapsed time tmr. The process then proceeds to step ST7 in FIG. 8.

Figure 11:
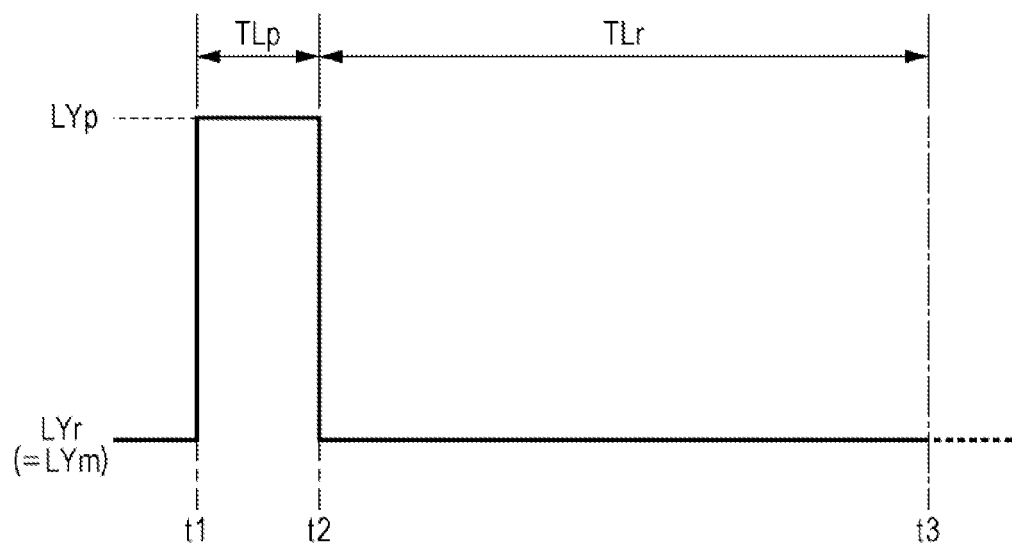
FIG. 11 illustrates a limitation operation performed on the correction control signal.

FIG. 11 illustrates the limitation operation performed on the correction control signal CYa. The drive unit 76 performs the processing in the flowchart illustrated in FIG. 10, and when the correction control signal CYa exceeds the output-current limit value LYm (=LYr) at time t1, the drive unit 76 limits the correction control signal CYa to a value that is smaller than or equal to the peak-current limit value LYp, as illustrated in FIG. 11. When the duration in which the correction control signal CYa exceeds the output-current limit value LYm exceeds the limit time TLp at time t2, the drive unit 76 limits the correction control signal CYa to a value that is smaller than or equal to the reset limit value LYr (=LYm) until time t3 at which the reset end time TLr is exceeded. The drive unit 76 performs such limitation processing, generates a first drive current on the basis of a correction control signal CYb resulting from the limitation, and outputs the first drive current. The drive unit 76 performs such processing on not only the correction control signal CYa but also the correction control signal CPa, generates a second drive current on the basis of a correction control signal CPb resulting from limitation, and outputs the second drive current.

Figure 12:
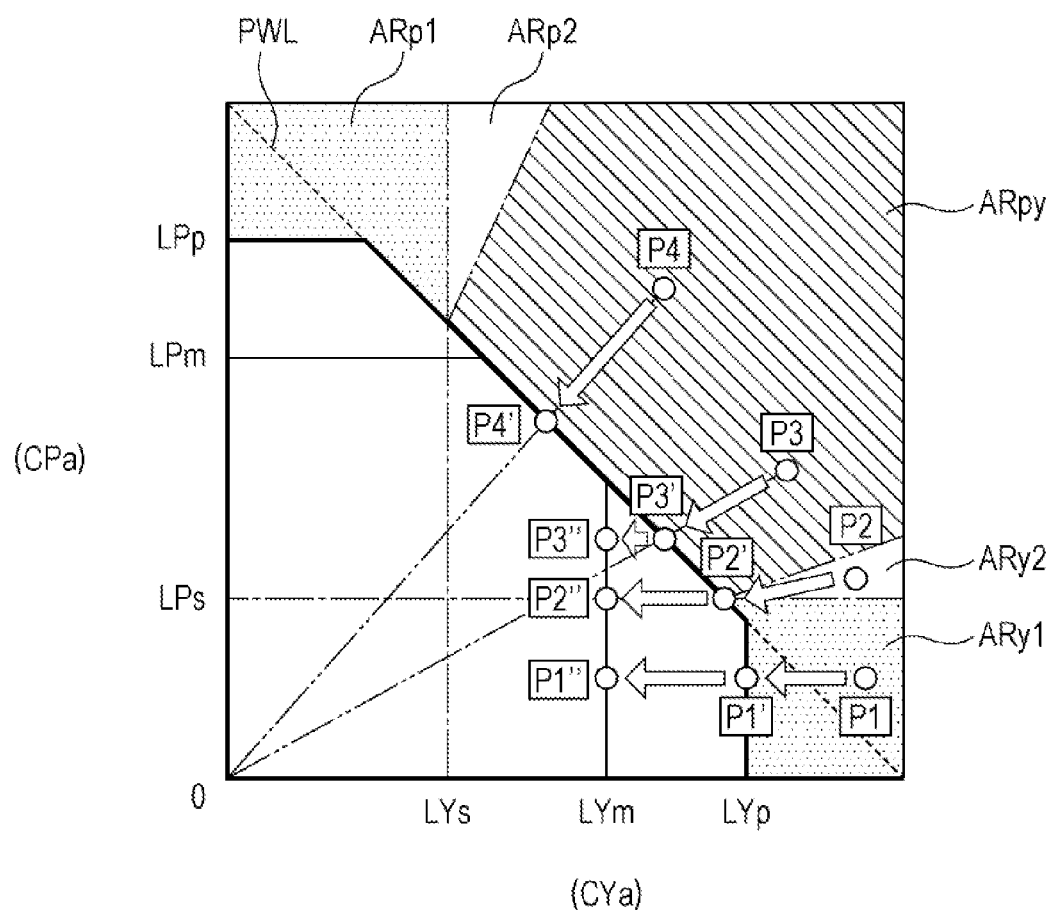
FIG. 12 illustrates an example of a limitation operation on the correction control signals.

FIG. 12 illustrates an example of a limitation operation on the correction control signals CYa and CPa. When the correction control signals CYa and CPa are at a position P1 in the area ARy1 in FIG. 12, the drive unit 76 limits only the correction control signal CYa since the correction control signal CPa is smaller than the minimum-current limit value LPs. In addition, since the correction control signal CYa exceeds the output-current limit value LYm, the drive unit 76 limits the correction control signal CYa to a value (position P1') that is smaller than or equal to the peak-current limit value LYp and the limit line PWL. Additionally, the drive unit 76 measures the elapsed time in which the correction control signal CYa exceeds the output-current limit value LYm, and when the elapsed time exceeds the limit time TLp, the drive unit 76 limits the correction control signal CYa to a value (position P1") that is smaller than or equal to the reset limit value LYr (=LYm).

When the correction control signals CYa and CPa are at a position P2 in the area ARy2, the drive unit 76 sets the correction control signal CPa to the minimum-current limit value LPs. The drive unit 76 also multiplies the reduction rate kp, with which the signal level of the correction control signal CPa is the minimum-current limit value LPs, by the signal level of the correction control signal CYa. Since the multiplication result exceeds the output-current limit value LYm, the drive unit 76 limits the correction control signal CYa to a value (position P2') that is smaller than or equal to the peak-current limit value LYp and is smaller than or equal to the limit line PWL. In addition, the drive unit 76 measures the elapsed time in which the correction control signal CYa exceeds the output-current limit value LYm, and when the elapsed time exceeds the limit time TLp, the drive unit 76 limits the correction control signal CYa to the reset limit value LYr (=LYm) (position P2").

When the correction control signals CYa and CPa are at a position P3 in the area ARpy, the drive unit 76 multiplies the correction control signals CYa and CPa by the same reduction rate to limit the correction control signals CYa and CPa to values (position P3') that are the smaller than or equal to values at positions on the limit line PWL. In this case, since the correction control signal CYa exceeds the output-current limit value LYm, the drive unit 76 limits the correction control signal CYa to a value that is smaller than or equal to the peak-current limit value LYp. In addition, the drive unit 76 measures the elapsed time in which the correction control signal CYa exceeds the output-current limit value LYm, and when the elapsed time exceeds the limit time TLp, the drive unit 76 limits the correction control signal CYa to the reset limit value LYr (=LYm) (position P3").

When the correction control signals CYa and CPa are at a position P4 in the area ARpy, the drive unit 76 multiplies the correction control signals CYa and CPa by the same reduction rate to limit the correction control signals CYa and CPa to values (position P4') that are smaller than or equal to positions on the limit line PWL. In this case, at any position on the limit line PWL, the correction control signal CYa is smaller than or equal to the output-current limit value LYm, and the correction control signal CPa is smaller than or equal to the output-current limit value LPm. Thus, the drive unit 76 limits the correction control signal CYa to a value that is smaller than or equal to the output-current limit value LYm and limits the correction control signal CPa to a value that is smaller than or equal to the output-current limit value LPm.

As a result of such processing, for example, when the correction control signal CYa exceeds the output-current limit value LYm and the elapsed time is within the range of the limit time TLp, the limit value for the correction control signal CYa is changed to the peak-current limit value LYp that is larger than the output-current limit value LYm. Thus, it is possible to increase the amount of current of the first drive current, compared with a case in which the correction control signal CYa is limited to a value that is smaller than or equal to the output-current limit value LYm. That is, the drive motor 191 can generate high torque. When similar limitation is also performed on the correction control signal CPa, it is possible to increase the amount of current of the second drive current, compared with a case in which the correction control signal CPa is limited using the output-current limit value LPm. That is, the second drive motor 192 can generate high torque. Thus, when a large shake occurs, a larger drive current than that in the related art can be supplied to thereby make it possible to enhance the shake correction performance. It is also possible to obtain favorable shake correction performance, without using a semiconductor device having a large rated output current.

In addition, when the correction control signal CYa is larger than or equal to the minimum-current limit value LYs, the correction control signal CYb resulting from the limitation is larger than or equal to the minimum-current limit value LYs even when the correction control signal CYa is limited. When the correction control signal CPa is larger than or equal to the minimum-current limit value LPs, the correction control signal CPb resulting from limitation is larger than or equal to the minimum-current limit value LPs even when the correction control signal CPa is limited. Accordingly, when a large drive current is involved in either the yaw direction or the pitch direction, a drive current corresponding to the minimum-current limit value is supplied for the shake correction in the other direction. Thus, it is possible to avoid a reduction in the shake correction performance in the other direction.

[4-2. Second Limitation Operation on Drive Currents]

Meanwhile, in a case in which the limitation of one drive current and the limitation of the other drive current are performed in association with each other, when the same reduction rate is used to limit the correction control signals CYa and CPa in the manner illustrated in FIG. 9, the drive unit 76 calculates the reduction rate corresponding to the signal levels of the correction control signals CYa and CPa. By performing multiplication processing using the calculated reduction rate, the drive unit 76 also calculates the limited correction control signals CYb and CPb.

Accordingly, a description for a second limitation operation will be given of an operation in which, when the correction control signals CYa and CPa are in the range of the area ARpy, the amount of limitation of one drive current is set to an amount of limitation corresponding to the amount of limitation of the other drive current to thereby make it easier to limit the correction control signals CYa and CPa.

Figure 13:
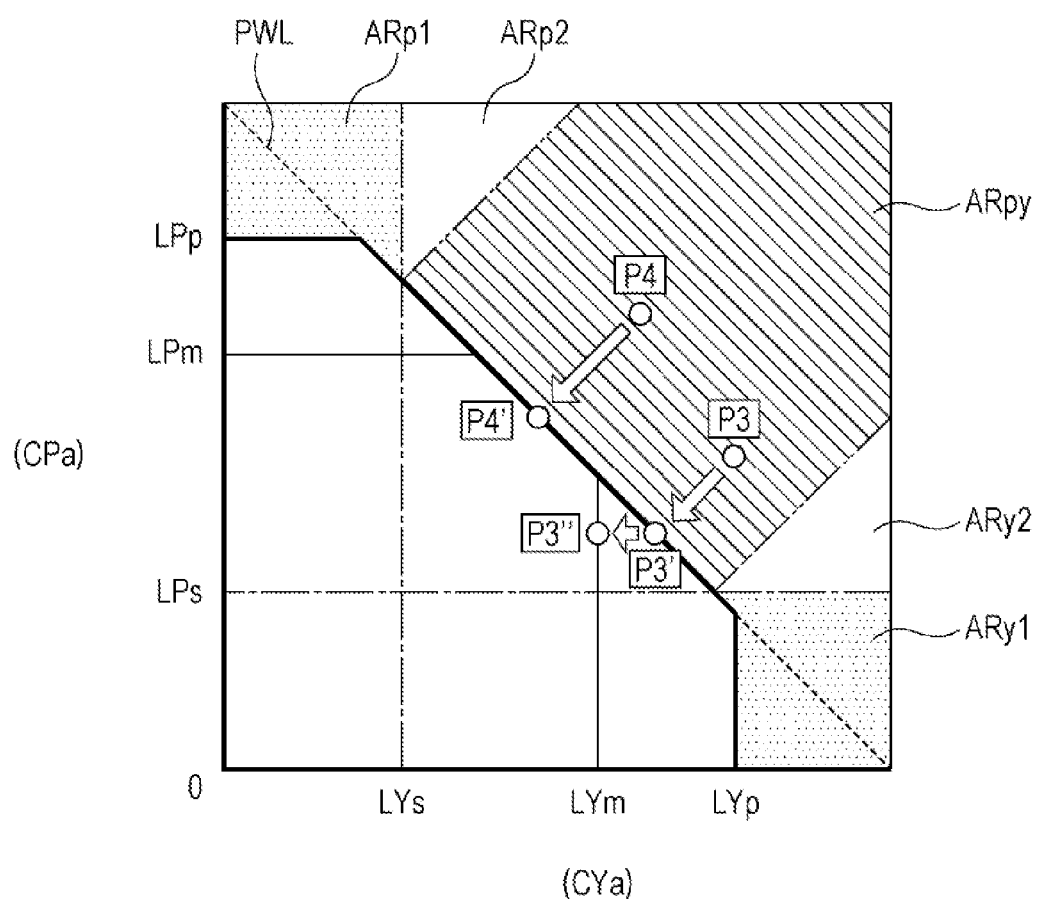
FIG. 13 illustrates a second limitation operation.

FIG. 13 illustrates the second limitation operation. In the second limitation operation, the reduction rate in the area ARpy is fixed. For example, when the correction control signals CYa and CPa are limited so as to lie on a line with a gradient of 45° (hereinafter referred to as a "reduction line"), the amount of limitation of the correction control signal CYa and the amount of limitation of the correction control signal CYa become equal to each other. Thus, with respect to any position in the area ARpy, for example, when a position obtained by reducing the correction control signal CYa by an amount of limitation "dL" lies at a position on the limit line PWL, reducing the correction control signal CPa by the amount of limitation "dL" makes it possible to bring the correction control signal CPa to a position on the limit line PWL.

Accordingly, it is possible to easily perform the limitation processing without performing calculation of the reduction rate corresponding to the signal levels of the correction control signals CYa and CPa and performing the multiplication processing using the calculated reduction rate.

For example, when the correction control signals CYa and CPa are at a position P3 in the area ARpy, the drive unit 76 brings the correction control signals CYa and CPa to a position (position P3') on the limit line PWL by reducing the correction control signals CYa and CPa by an amount of limitation "dLa". In this case, since the correction control signal CYa exceeds the output-current limit value LYm, the drive unit 76 limits the correction control signal CYa to a value that is smaller than or equal to the peak-current limit value LYp. In addition, the drive unit 76 measures the elapsed time in which the correction control signal CYa exceeds the output-current limit value LYm, and when the elapsed time exceeds the limit time TLp, the drive unit 76 limits the correction control signal CYa to the reset limit value LYr (=LYm) (position P3").

When the correction control signals CYa and CPa are at a position P4 in the area ARpy, the drive unit 76 brings the correction control signals CYa and CPa to a position (position P4') on the limit line PWL by reducing the correction control signals CYa and CPa by an amount of limitation "dLb". In this case, the position on the limit line PWL is a position where the correction control signal CYa is smaller than or equal to the output-current limit value LYm and the correction control signal CPa is smaller than or equal to the output-current limit value LPm. Accordingly, the drive unit 76 limits the correction control signal CYa to a value that is smaller than or equal to the output-current limit value LYm and limits the correction control signal CPa to a value that is smaller than or equal to the output-current limit value LPm.

Such a limitation operation makes it possible to easily perform the limitation operation in the area ARpy. The gradient of the reduction line may be set according to the gradient of the limit line PWL. When the gradient of the reduction line is not 45°, for example, the amounts of limitation of the correction control signal CPa which correspond to the amounts of limitation of the correction control signal CYa are tabularized and are pre-stored. With such an arrangement, when the amount of limitation corresponding to the amount of limitation of the correction control signal CYa is obtained from the table and is used, it is possible to easily limit the correction control signal CPa.

[4-3. Third Limitation Operation on Drive Currents]

Although a case in which the peak-current limit values set by reducing the power-supply times are fixed has been described above in the first limitation operation, the peak-current limit values may also be changed to perform the limitation operation.

Next, a description for a third limitation operation on the drive currents will be given of a case in which the first limit value is varied according to the amount of current of the first drive current used for correcting image blur in the first direction and the second limit value is varied according to the amount of current of the second drive current used for correcting image blur in the second direction.

A case in which the peak-current limit value LYp is varied to perform the limitation operation will be described as the third limitation operation on the drive currents. For example, it is assumed that the output time (power-supply time) of the drive-current output unit 762 when the rated output peak current has a current value Ip1 is limited to a value that is smaller than or equal to a first peak-current limit time Tp1. It is also assumed that the output time of the drive-current output unit 762 when the rated output peak current has a current value Ip2 (<Ip1) is limited to a value that is smaller than or equal to a second peak-current limit time Tp2 (>Tp1). It is further assumed that the output time of the drive-current output unit 762 when the rated output peak current has a current value Ip3 (<Ip2) is limited to a value that is smaller than or equal to a third peak-current limit time Tp3 (>Tp2).

FIG. 14 is a flowchart illustrating the third limitation operation. FIG. 14 illustrates the third limitation operation for the correction control signal CYa. In the initial setting in step ST1 described above and illustrated in FIG. 8, the drive unit 76 in the image-blur correction control unit 70 sets a first peak-current limit value LYp1 so that, for example, it does not exceed the maximum rated output peak current value (the current value Ip1 in the first peak-current limit time Tp1). The drive unit 76 also sets a first limit time TLp1, which is a limit time for the limitation operation using the first peak-current limit value LYp1, to the first peak-current limit time Tp1. The drive unit 76 also sets a second peak-current limit time LYp2 so that it does not exceed the maximum rated output peak current value (the current value Ip2 in the second peak-current limit time Tp2). The drive unit 76 also sets a third peak-current limit value LYp3 so that it does not exceed the maximum rated output peak current value (the current value Ip3 in the third peak-current limit time Tp3).

In addition, the drive unit 76 sets "0" for a first limit elapsed time tmp1, a second limit elapsed time tmp2, a third limit elapsed time tmp3, and the reset elapsed time tmr. The first limit elapsed time tmp1 is an elapsed time in which the limitation operation is performed using the first peak-current limit time LYp1. The second limit elapsed time tmp2 is an elapsed time in which the limitation operation is performed using the second peak-current limit time LYp2. The third limit elapsed time tmp3 is an elapsed time in which the limitation operation is performed using the third peak-current limit value LYp3. The reset elapsed time tmr is an elapsed time in which the limitation operation is reset.

In step ST21, the drive unit 76 determines whether or not the correction control signal CYa supplied from the servo arithmetic unit 75 exceeds the second peak-current limit time LYp2. When the correction control signal CYa exceeds the second peak-current limit time LYp2, the process of the drive unit 76 proceeds to step ST22. When the correction control signal CYa does not exceed the second peak-current limit time LYp2, the process proceeds to step ST25.

In step ST22, the drive unit 76 measures the first limit elapsed time tmp1. More specifically, the drive unit 76 starts a first limitation operation for limiting the correction control signal CYa to a value that is smaller than or equal to the first peak-current limit time LYp1 and measures the first limit elapsed time tmp1. During the first limitation operation, the drive unit 76 continues the measurement of the first limit elapsed time tmp1. In addition, during the first limitation operation, the drive unit 76 sets "0" for the reset elapsed time tmr, which is the time in which the limitation operation is reset. The process then proceeds to step ST23.

In step ST23, the drive unit 76 determines whether or not the first limit elapsed time tmp1 exceeds the first limit time TLp1. When the first limit elapsed time tmp1 exceeds the first limit time TLp1, the process of the drive unit 76 proceeds to step ST24. When the first limit elapsed time tmp1 does not exceed the first limit time TLp1, the process proceeds to step ST7 illustrated in FIG. 8.

In step ST24, the drive unit 76 rests the limitation operation. That is, the drive unit 76 changes the limit value from the first peak-current limit time LYp1 to the reset limit value LYr. The process then proceeds to step ST7 illustrated in FIG. 8.

When the process proceeds from step ST21 to step ST25, the drive unit 76 performs operation setting for a second limitation operation. That is, the drive unit 76 sets a second limit time TLp2 in accordance with the first limit elapsed time tmp1 and/or the amount of drive current in the first limitation operation. The process then proceeds to step ST26. In the setting of the second limit time TLp2, for example, when the first limit elapsed time tmp1 exceeds the first limit time TLp1, the drive unit 76 sets "0" for the second limit time TLp2 so that the reset operation is continuously performed. When the first limit elapsed time tmp1 is "0", the drive unit 76 sets the second limit time TLp2 to the second peak-current limit time Tp2. When the first limit elapsed time tmp1 is larger than "0" and is smaller than the first limit time TLp1, the drive unit 76 sets the second limit time TLp2 in accordance with a time difference between the first limit elapsed time tmp1 and the first peak-current limit time Tp1. The drive unit 76 may also set the second limit time TLp2 in accordance with the first limit elapsed time tmp1 and/or the amount of drive current in the first limitation operation or in accordance with the amount of drive current in the first limitation operation. The second limit time TLp2 in this case is larger than "0" and is smaller than the second peak-current limit time Tp2. When the second limit time TLp2 is set as described above, for example, it is possible to ensure that no first drive current is continuously output as the current value Ip2 after the state in which the first drive current is set to the current value Ip1 elapses for the first peak-current limit time Tp1. That is, it is possible to perform drive-current output control processing corresponding to the drive-current output unit 762.

In step ST26, the drive unit 76 determines whether or not the correction control signal CYa supplied from the servo arithmetic unit 75 exceeds the third peak-current limit value LYp3 and the second limit time TLp2 is larger than "0". When the correction control signal CYa exceeds the third peak-current limit value LYp3 and the second limit time TLp2 is larger than "0", the process of the drive unit 76 proceeds to step ST27. Otherwise, the process proceeds to step ST30.

In step ST27, the drive unit 76 measures the second limit elapsed time tmp2. More specifically, the drive unit 76 starts the second limitation operation for limiting the correction control signal CYa to a value that is smaller than or equal to the second peak-current limit time LYp2 and measures the second limit elapsed time tmp2. The processing in step ST27 is performed when the correction control signal CYa is smaller than or equal to the second peak-current limit time LYp2 and exceeds the third peak-current limit value LYp3. Thus, the operation enters the state of the second limitation operation in which the correction control signal CYa is limited to a value that is smaller than or equal to the second peak-current limit time LYp2. During the second limitation operation, the drive unit 76 continues the measurement of the second limit elapsed time tmp2. In addition, during the second limitation operation, the drive unit 76 sets "0" for the reset elapsed time tmr. The process then proceeds to step ST28.

In step ST28, the drive unit 76 determines whether or not the second limit elapsed time tmp2 exceeds the second limit time TLp2. When the second limit elapsed time tmp2 exceeds the second limit time TLp2, the process of the drive unit 76 proceeds to step ST29. When the second limit elapsed time tmp2 does not exceed the second limit time TLp2, the process proceeds to step ST7 illustrated in FIG. 8.

In step ST29, the drive unit 76 resets the limitation operation. That is, the drive unit 76 changes the limit value to the reset limit value LYr. The process then proceeds to step ST7 illustrated in FIG. 8.

When the process proceeds from step ST25 to step ST30, the drive unit 76 performs operation setting for a third limitation operation. The drive unit 76 sets a third limit time TLp3 in accordance with the first limit elapsed time tmp1 and the second limit elapsed time tmp2 and/or the amounts of drive current in the first limitation operation and the second limitation operation. The process then proceeds to step ST31. For setting the third limit time TLp3, for example, when the first limit elapsed time tmp1 exceeds the first limit time TLp1 and the second limit elapsed time tmp2 exceeds the second limit time TLp2, the drive unit 76 sets "0" for the third limit time TLp3. With such an arrangement, the reset operation is continuously performed without performing the third limitation operation. When the first limit elapsed time tmp1 and the second limit elapsed time tmp2 are "0", the drive unit 76 sets the third limit time TLp3 to the third peak-current limit time Tp3. When either the first limit elapsed time tmp1 or the second limit elapsed time tmp2 is larger than or equal to "0" and the first limit elapsed time tmp1 is smaller than the first limit time TLp1 and when the second limit elapsed time tmp2 is smaller than the second limit time TLp2, the drive unit 76 sets the third limit time TLp3 in accordance with a difference time between the first limit elapsed time tmp1 and the first peak-current limit time Tp1 and a difference time between the second limit elapsed time tmp2 and the second peak-current limit time Tp2. The drive unit 76 may also set the third limit time TLp3 in accordance with the first limit elapsed time tmp1, the amount of drive current in the first limitation operation, the second limit elapsed time tmp2, and the amount of drive current in the second limitation operation or in accordance with the amount of drive current in the first limitation operation and the amount of drive current in the second limitation operation. The third limit time TLp3 in this case is "0" or larger and is smaller than the third peak-current limit time Tp3.

In step ST32, the drive unit 76 measures the third limit elapsed time tmp3. More specifically, the drive unit 76 starts the third limitation operation for limiting the correction control signal CYa to a value that is smaller than or equal to the third peak-current limit value LYp3 and measures the third limit elapsed time tmp3. The process in step ST32 is performed when the correction control signal CYa is smaller than or equal to the third peak-current limit value LYp3 and is large than the output-current limit value LYm. Thus, the operation enters the state of the third limitation operation in which the correction control signal CYa is limited to a value that is smaller than or equal to the third peak-current limit value LYp3. During the third limitation operation, the drive unit 76 continues the measurement of the third limit elapsed time tmp3. In addition, during the third limitation operation, the drive unit 76 sets "0" for the reset elapsed time tmr. The process then proceeds to step ST33.

In step ST33, the drive unit 76 determines whether or not the third limit elapsed time tmp3 exceeds the third limit time TLp3. When the third limit elapsed time tmp3 exceeds the third limit time TLp3, the process of the drive unit 76 proceeds to step ST34. When the third limit elapsed time tmp3 does not exceed the third limit time TLp3, the process proceeds to step ST7 illustrated in FIG. 8.

In step ST34, the drive unit 76 resets the limitation operation. That is, the drive unit 76 changes the limit value to the reset limit value LYr. The process then proceeds to step ST7 illustrated in FIG. 8.

When the process proceeds from step ST31 to step ST35, the drive unit 76 resets the limit elapsed times. That is, the drive unit 76 sets "0" for the first limit elapsed time tmp1, the second limit elapsed time tmp2, and the third limit elapsed time tmp3. The process then proceeds to step ST36.

In step ST36, the drive unit 76 measures the reset elapsed time tmr. More specifically, the drive unit 76 starts a reset operation for limiting the correction control signal CYa to a value that is smaller than or equal to the reset limit value LYr (=LYm) and measures the reset elapsed time tmr. During the reset operation, the drive unit 76 continues the measurement of the reset elapsed time tmr, and the process proceeds to step ST37.

In step ST37, the drive unit 76 determines whether or not the reset elapsed time tmr exceeds the preset reset end time TLr. When the reset elapsed time tmr exceeds the reset end time TLr, the process of the drive unit 76 proceeds to step ST38. When the reset elapsed time tmr does not exceed the reset end time TLr, the process proceeds to step ST7 illustrated in FIG. 8.

In step ST38, the drive unit 76 performs a reset release operation. That is, the drive unit 76 changes the limit value from the reset limit value LYr to the first peak-current limit time LYp1. The drive unit 76 also sets "0" for the reset elapsed time tmr. The process then proceeds to step ST7 illustrated in FIG. 8.

Figure 15A:
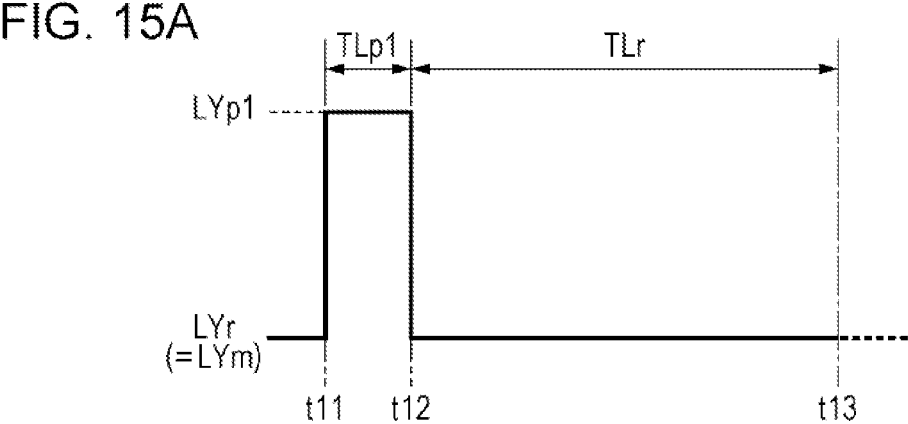
FIGS. 15A to 15C illustrate the third limitation operation.
Figure 15B:
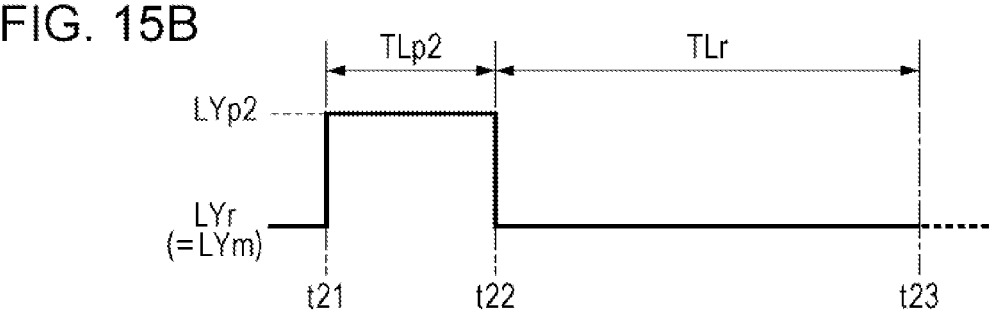
Figure 15C:
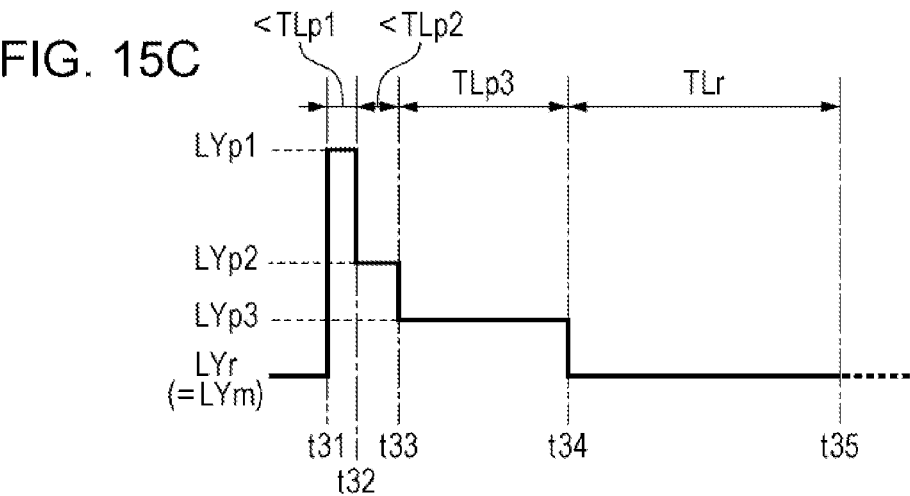

FIGS. 15A to 15C illustrate the limitation operation on the correction control signal CYa. As illustrated in FIG. 15A, for example, when the correction control signal CYa exceeds the second peak-current limit time LYp2 at time t11, the drive unit 76 limits the correction control signal CYa to a value that is smaller than or equal to the first peak-current limit time LYp1. When the elapsed time in which the correction control signal CYa exceeds the second peak-current limit time LYp2 exceeds the first limit time TLp1 at time t12, the drive unit 76 limits the correction control signal CYa to a value that is smaller than or equal to the reset limit value LYr (=LYm) until time t13 at which the reset end time TLr is exceeded.

As illustrated in FIG. 15B, for example, when the correction control signal CYa exceeds the third peak-current limit value LYp3 and is smaller than or equal to the second peak-current limit time LYp2 at time t21, the drive unit 76 uses the pre-limitation correction control signal CYa as the limited correction control signal CYb. That is, the operation enters a state in which the correction control signal CYa is limited to a value that is smaller than or equal to the second peak-current limit time LYp2. When the elapsed time in which the correction control signal CYa exceeds the third peak-current limit value LYp3 and is smaller than or equal to the second peak-current limit time LYp2 exceeds the second limit time TLp2 at time t22, the drive unit 76 limits the correction control signal CYa to a value that is smaller than or equal to the reset limit value LYr (=LYm) until time t23 at which the reset end time TLr is exceeded.

As illustrated in FIG. 15C, for example, when the correction control signal CYa exceeds the second peak-current limit time LYp2 at time t31, the drive unit 76 limits the correction control signal CYa to a value that is smaller than or equal to the first peak-current limit time LYp1. When the correction control signal CYa is larger than the third peak-current limit value LYp3 and is smaller than or equal to the second peak-current limit time LYp2 at time t32 before the first limit time TLp1, the drive unit 76 sets the second limit time TLp2, for example, in accordance with a difference time between the first limit elapsed time tmp1 and the first limit time TLp1. That is, the operation enters a state in which the correction control signal CYa is limited to a value that is smaller than or equal to the second limit time TLp2 from time t32 until the time at which the second peak-current limit time LYp2 elapses. When the correction control signal CYa is larger than the output-current limit value LYm and is smaller than or equal to the third peak-current limit value LYp3 at time t33 before the second limit time TLp2, the drive unit 76 sets the third limit time TLp3, for example, in accordance with a difference time between the first limit elapsed time tmp1 and the first limit time TLp1 and a difference time between the second limit elapsed time tmp2 and the second limit time TLp2. That is, the operation enters a state in which the correction control signal CYa is limited to a value that is smaller than or equal to the third peak-current limit value LYp3 from time t33 until the time at which the third limit time TLp3 elapses. When the elapsed time in which the correction control signal CYa is larger than the output-current limit value LYm and is smaller than or equal to the third peak-current limit value LYp3 exceeds the third limit time TLp3 at time t34, the drive unit 76 limits the correction control signal CYa to a value that is smaller than or equal to the reset limit value LYr (=LYm) until time t35 at which the reset end time TLr is exceeded.

The drive unit 76 performs such processing on not only the correction control signal CYa but also the correction control signal CPa, generates the second drive current on the basis of the limited correction control signal CPb, and outputs the second drive current.

As a result of such processing performed on not only the correction control signal CYa but also the correction control signal CPa, when the correction control signal exceeds the output-current limit value LYm (LPm), the correction control signal is limited with a limit value corresponding to the excess. Thus, when the excess is large, the first drive current and the second drive current can be set to have large current values for a short period of time and thus high torque can be generated. When the excess is small, a first drive current and a second drive current that are larger than those drive currents in the related art, although they are smaller than those when the excess is large, can be output for a longer period of time than the period of time when the excess is large. Thus, high torque can be generated compared with the related art. Accordingly, the shake correction performance when a large shake occurs can be improved compared with the related art. In addition, since the limit value and the limit time are changed in accordance with the signal level of the corresponding correction control signal, it is possible to perform shake correction corresponding to the magnitude of shake.

[4-4. Other Limitation Operations on Drive Currents]

Meanwhile, when the first drive current or the second drive current is supplied to a coil in the drive motor or the like, the temperature of the coil may change. The temperature of the coil may also change depending on the operating environment. When such a coil temperature change or the like occurs, there is a possibility that the resistance value of the coil may change. Upon change in the resistance value of the coil, for example, when the correction control signal is set to the limit value, there are cases in which the drive current is not constant. Accordingly, the drive unit 76 performs correction based on the correction control signals having the limit values so that a first drive signal supplied to the first correction mechanism and a second drive signal supplied to the second correction mechanism have constant current values corresponding to the limit values. For example, the drive unit 76 detects a change in the temperature of the coil and a change in the resistance value thereof and corrects each limit value, based on a result of the detection, so as to ensure that the current value of the corresponding drive current does not change even when the resistance value of the coil changes. Such an arrangement makes it possible to avoid a situation in which the resistance value of the coil changes to cause the drive current to exceed, for example, the corresponding limit value.

In the limitation operation on the correction control signal, when the limit value and the limit time are changed according to the signal level of the correction control signal as in the second limitation operation, the limit time may be switched after performing the reset operation. In this case, the reset period is provided before changing the limitation operation. Thus, when the second limitation operation or the third limitation operation is performed, the limit time may be calculated, for example, without considering the elapsed time of the limitation operation that has been performed.

[5. Other Configurations and Operations of Image Capture Apparatus]

Although examples in which a shake in the yaw direction and the pitch direction is corrected have been described in the above embodiments, the shake correction is not limited to two axes in the yaw direction and the pitch direction. For example, in addition to the yaw direction and the pitch direction, the shake correction in a rotation direction about an optical axis may also be performed. For example, a support mechanism is provided to support the gimbal vibration isolation mechanism 15 (illustrated in FIG. 2) to allow rotation about the optical axis, and a drive mechanism is provided to rotate the gimbal vibration isolation mechanism 15 about the optical axis.

The shake detecting unit 61 also detects a shake in the rotation direction about the optical axis, and the position detecting unit 46 detects, in the gimbal vibration isolation mechanism 15, a position in the rotation direction about the optical axis. The image-blur correction control unit 70 generates a correction control signal on the basis of the shake and the position in the rotation direction about the optical axis. The image-blur correction control unit 70 generates drive currents on the basis of the correction control signals and outputs the drive currents to the image-blur correcting unit 45, to thereby perform shake correction not only in the yaw direction and pitch direction but also in the rotation direction about the optical axis.

The image-blur correction control unit 70 also limits the correction control signals in accordance with the power supply of the power-supply unit and the rated output current and the rated peak output current of the semiconductor device that outputs the drive currents, as well as the drive current for performing shake correction in the rotation direction about the optical axis. For example, the drive-current limiting unit 761 in the image-blur correction control unit 70 limits a third drive current for the shake correction in the rotation direction about the optical axis to a fourth limit value and limits a total value of the first drive current, the second drive current, and the third drive current to a third limit value that is smaller than a total value of the first limit value, the second limit value, and the fourth limit value. In addition, the drive-current limiting unit 761 varies the fourth limit value corresponding to the third drive current by changing the power-supply time of the third drive current, for example, by reducing the power supply time of the third drive current, to thereby increase the fourth limit value so that a large third drive current can be output.

With such an arrangement, the shake correction performance can be enhanced not only when the shake correction is performed in the yaw direction and the pitch direction but also when the shake correction is performed in the rotation direction about the optical axis.

The series of processing described hereinabove can be executed by hardware, software, or a combination of thereof. When the processing is executed by software, a program in which a processing sequence has been recorded is loaded into a memory in a computer incorporated in dedicated hardware and is executed. Alternatively, the program can be executed by a general-purpose computer that can execute various types of processing, through installation of the program.

For example, the program can be pre-recorded to a recording medium, such as a hard disk or a read only memory (ROM). Alternatively, the program can be temporarily or permanently stored on (recorded to) a removable recording medium, such as a flexible disk, a compact disc read only memory (CD-ROM), a magneto optical (MO) disk, a digital versatile disc (DVD), a magnetic disk, or a semiconductor memory card. Such a removable recording medium can be provided in the form of the so-called packaged software.

In addition to installation from a removable recording medium to a computer, the program may also be transferred from a download side to a computer through a network, such as a local area network (LAN) or the Internet, in a wireless or wired manner. The computer can receive the program transferred in such a manner and can load the program to a recording medium, such as a built-in hard disk.

The present technology is not to be construed as being limited to the above-described technical embodiments. The technical embodiments of the present technology are disclosed by way of example, and it is apparent to those skilled in the art that various modifications and substitutions are possible to the embodiments without departing from the spirit and scope of the present technology. That is to say, the scope of the appended claims is to be considered in order to determine the spirit and scope of the present technology.

The image-blur correction device according to the embodiment of the present technology can also have the following configuration.

(1) An image-blur correction device including a drive-current output unit configured to output a first drive current for driving a first correction mechanism for correcting image blur in a first direction orthogonal to an optical axis and a second drive current for driving a second correction mechanism for correcting image blur in a second direction orthogonal to the optical axis and the first direction; and a drive-current limiting unit configured to limit the first drive current to a first limit value, limit the second drive current to a second limit value, limit a total value of the first drive current and the second drive current to a third limit value that is smaller than a total value of the first limit value and the second limit value, vary the first limit value by changing a power-supply time of the first drive current, and vary the second limit value by changing a power-supply time of the second drive current.

(2) The image-blur correction device according to (1), wherein the drive-current limiting unit reduces a power-supply time in which the first drive current is limited to the first limit value to thereby increase the first limit value and reduces a power-supply time in which the second drive current is limited to the second limit value to thereby increase the second limit value.

(3) The image-blur correction device according to (1) or (2), wherein the drive-current limiting unit varies the first limit value in accordance with an amount of current of the first drive current used for correcting the image blur in the first direction and varies the second limit value in accordance with an amount of current of the second drive current used for correcting the image blur in the second direction.

(4) The image-blur correction device according to one of (1) to (3), wherein the drive-current limiting unit sets limit values for ensuring minimum drive currents for the first limit value and the second limit value.

(5) The image-blur correction device according to one of (1) to (4), wherein during limitation of the first drive current and the second drive current, the drive-current limiting unit performs the limitation of one of the first and second drive currents and the limitation of the other drive current in association with each other.

(6) The image-blur correction device according to one of (1) to (5), wherein the drive-current limiting unit sets an amount of limitation of the one drive current to an amount of limitation corresponding to an amount of limitation of the other drive current.

(7) The image-blur correction device according to one of (1) to (6), wherein the drive-current limiting unit limits correction control signals generated so as to correct the image blur, in accordance with a detection result of the image blur, and corrects the correction control signals so that the first drive signal supplied from the drive-current output unit to the first correction mechanism and the second drive signal supplied from the drive-current output unit to the second correction mechanism, the first drive signal and the second drive signal being supplied based on the correction control signals having limit values, have constant current values corresponding to the limit values.

(8) The image-blur correction device according to one of (1) to (7), wherein the drive-current limiting unit sets the third limit value in accordance with a power supply capability of a power-supply unit that supplies power used for generating the first drive current and the second drive current.

(9) The image-blur correction device according to one of (1) to (8), wherein the drive-current output unit outputs a third drive current for driving a third correction mechanism for correcting image blur in a rotation direction about the optical axis; and the drive-current limiting unit limits the third drive current to a fourth limit value, limits a total value of the first drive current, the second drive current, and the third drive current to a third limit value that is smaller than a total value of the first limit value, the second limit value, and the fourth limit value, and varies the fourth limit value by changing a power-supply time of the third drive current.

It should be understood by those skilled in the art that various modifications, combinations, sub-combinations and alterations may occur depending on design requirements and other factors insofar as they are within the scope of the appended claims or the equivalents thereof.

What is claimed is:

1. An image-blur correction device comprising:
one or more processors operable to:
output a first drive current for driving a first correction mechanism for correcting image blur in a first direction orthogonal to an optical axis;
output a second drive current for driving a second correction mechanism for correcting image blur in a second direction orthogonal to the optical axis and the first direction;
limit the first drive current to a first limit value, wherein the first limit value is based on a minimum value of the first drive current to obtain image blur correction in the first direction in an event image blur correction in the second direction is performed;
limit the second drive current to a second limit value;
limit a total value of the first drive current and the second drive current to a third limit value that is smaller than a total value of the first limit value and the second limit value;
vary the first limit value by changing a power-supply time of the first drive current; and
vary the second limit value by changing a power-supply time of the second drive current.

2. The image-blur correction device according to claim 1, wherein the one or more processors are operable to reduce the power-supply time in which the first drive current is limited to the first limit value to thereby increase the first limit value and reduce the power-supply time in which the second drive current is limited to the second limit value to thereby increase the second limit value.

3. The image-blur correction device according to claim 1, wherein the one or more processors are operable to vary the first limit value in accordance with an amount of current of the first drive current used for correcting the image blur in the first direction and vary the second limit value in accordance with an amount of current of the second drive current used for correcting the image blur in the second direction.

4. The image-blur correction device according to claim 1, wherein the one or more processors are operable to set limit values for ensuring minimum drive currents for the first limit value and the second limit value.

5. The image-blur correction device according to claim 1, wherein, during limitation of the first drive current and the second drive current, the one or more processors are operable to perform the limitation of one of the first and second drive currents and the limitation of the other drive current in association with each other.

6. The image-blur correction device according to claim 1, wherein the one or more processors are operable to set an amount of limitation of one of the first and second drive currents to an amount of limitation corresponding to an amount of limitation of the other of the first and second drive currents.

7. The image-blur correction device according to claim 1, wherein the one or more processors are operable to limit correction control signals generated to correct the image blur in accordance with a detection result of the image blur, and correct the correction control signals so that the first drive current supplied to the first correction mechanism and the second drive current supplied to the second correction mechanism, the first drive current and the second drive current supplied based on the correction control signals having limit values, have constant current values corresponding to the limit values.

8. The image-blur correction device according to claim 1, wherein the one or more processors are operable to set the third limit value in accordance with a power supply capability of a power-supply unit that supplies power used for generating the first drive current and the second drive current.

9. The image-blur correction device according to claim 1, wherein the one or more processors are operable to:
a third drive current for driving a third correction mechanism for correcting image blur in a rotation direction about the optical axis; and
limit the third drive current to a fourth limit value,
limit a total value of the first drive current, the second drive current, and the third drive current to a fifth limit value that is smaller than a total value of the first limit value, the second limit value, and the fourth limit value, and
vary the fourth limit value by changing a power-supply time of the third drive current.

10. The image-blur correction device according to claim 1, wherein the second limit value is based on a minimum value of the second drive current to obtain image blur correction in the second direction in an event image blur correction in the first direction is performed.

11. The image-blur correction device according to claim 1, wherein the first limit value and the second limit value are based on a maximum rated output current.

12. The image-blur correction device according to claim 1, wherein the first limit value and the second limit value are based on a maximum rated output peak current.

13. An image-blur correction method comprising:
in an image-blur correction device:
outputting a first drive current for driving a first correction mechanism for correcting image blur in a first direction orthogonal to an optical axis;
outputting a second drive current for driving a second correction mechanism for correcting image blur in a second direction orthogonal to the optical axis and the first direction;
limiting the first drive current to a first limit value, wherein the first limit value is based on a minimum value of the first drive current to obtain image blur correction in the first direction in an event image blur correction in the second direction is performed;
limiting the second drive current to a second limit value;

limiting a total value of the first drive current and the second drive current to a third limit value that is smaller than a total value of the first limit value and the second limit value;

varying the first limit value by changing a power-supply time of the first drive current; and varying the second limit value by changing a power-supply time of the second drive current.

14. An image capture apparatus comprising:
one or more processors operable to:
generate an image signal of a captured image;
detect shake of the image capture apparatus;
output a first drive current for driving a first correction mechanism for correcting, in the captured image, image blur in a first direction orthogonal to an optical axis;
output a second drive current for driving a second correction mechanism for correcting, in the captured image, image blur in a second direction orthogonal to the optical axis and the first direction; and limit the first drive current to a first limit value, wherein the first limit value is based on a minimum value of the first drive current to obtain image blur correction in the first direction in an event image blur correction in the second direction is performed;

limit the second drive current to a second limit value;

limit a total value of the first drive current and the second drive current to a third limit value that is smaller than a total value of the first limit value and the second limit value, in accordance with detected shake;

vary the first limit value by changing a power-supply time of the first drive current; and vary the second limit value by changing a power-supply time of the second drive current.

* * * * *